US011862019B2

(12) United States Patent
Arnold et al.

(10) Patent No.: US 11,862,019 B2
(45) Date of Patent: Jan. 2, 2024

(54) LIGHTWEIGHT DOCKING STATION FOR MICROMOBILITY TRANSIT VEHICLES SYSTEMS AND METHODS

(71) Applicant: Lyft, Inc., San Francisco, CA (US)

(72) Inventors: Brent Michael Arnold, Rowayton, CT (US); Erik Keith Askin, San Francisco, CA (US); Jonathan Scott Bernbach, Brooklyn, NY (US); Mayank Manesh Makwana, San Francisco, CA (US); Griffin Samuel Valentine Thomson, San Francisco, CA (US); Collin O'Neil Waldoch, Brooklyn, NY (US)

(73) Assignee: Lyft, Inc., San Francisco, CA (US)

( * ) Notice: Subject to any disclaimer, the term of this patent is extended or adjusted under 35 U.S.C. 154(b) by 179 days.

(21) Appl. No.: 17/239,966

(22) Filed: Apr. 26, 2021

(65) Prior Publication Data

US 2021/0343147 A1  Nov. 4, 2021

Related U.S. Application Data

(63) Continuation of application No. 16/865,041, filed on May 1, 2020, now Pat. No. 10,991,250.

(51) Int. Cl.
*G08G 1/14* (2006.01)
*H04W 4/40* (2018.01)

(52) U.S. Cl.
CPC .............. *G08G 1/143* (2013.01); *G08G 1/146* (2013.01); *H04W 4/40* (2018.02)

(58) Field of Classification Search
CPC ........ G08G 1/143; G08G 1/146; G08G 1/144; H04W 4/40; H04W 4/024; B62H 3/08;
(Continued)

(56) References Cited

U.S. PATENT DOCUMENTS 4,920,334 A * 4/1990 DeVolpi ................... B62H 3/04
340/568.4
5,917,407 A * 6/1999 Squire ................. G07F 17/0057
235/382
(Continued)

FOREIGN PATENT DOCUMENTS

CN      106828672 A  *  6/2017  ............... B62H 3/00
CN      207029387 U  *  2/2018
(Continued)

OTHER PUBLICATIONS

Dero Bike Racks—Archived catalog from Jan. 17, 2015 and Jan. 22, 2015 (Year: 2015).*
(Continued)

*Primary Examiner* — Ryan W Sherwin
(74) *Attorney, Agent, or Firm* — Baker Botts L.L.P.

(57) ABSTRACT

Techniques are disclosed for systems associated with lightweight docking stations for one or more micromobility transit vehicles. The docking station may include multiple racks. Each rack may include a base frame having frame segments, an anchor coupled to and extending vertically from at least one of the frame segments of the base frame, and a lock plate coupled to the anchor and including a lock hole. The lock hole is disposed through the lock plate and is capable of receiving a locking device associated with a micromobility transit vehicle so as to permit locking of the micromobility transit vehicle to the anchor.

20 Claims, 25 Drawing Sheets

(58) Field of Classification Search
CPC .............. B62H 5/003; B62H 2003/005; G01C 21/3682; G01C 21/3423; G06Q 10/02; G06Q 50/30
See application file for complete search history.

(56) References Cited

U.S. PATENT DOCUMENTS

| | | | |
|---|---|---|---|
| 8,061,499 B2 * | 11/2011 | Khairallah | B62H 3/04 340/432 |
| 2008/0034820 A1 * | 2/2008 | Gagosz | B62M 6/40 70/235 |
| 2009/0240575 A1 | 9/2009 | Bettez | |
| 2010/0228405 A1 * | 9/2010 | Morgal | B62H 3/00 701/1 |
| 2011/0148346 A1 * | 6/2011 | Gagosz | B60L 50/20 320/135 |
| 2011/0226708 A1 * | 9/2011 | Mercat | B62H 3/02 211/5 |
| 2012/0109721 A1 | 5/2012 | Cebon | |
| 2015/0096335 A1 * | 4/2015 | Haidak | B62H 3/02 70/57.1 |
| 2015/0152668 A1 * | 6/2015 | Assenat | B62H 3/02 70/277 |
| 2015/0330109 A1 | 11/2015 | Tepper | |
| 2015/0360739 A1 * | 12/2015 | Ashlag | B62H 3/08 211/5 |
| 2018/0022410 A1 * | 1/2018 | Kritzer | B62H 3/04 211/5 |
| 2018/0080241 A1 * | 3/2018 | Greenblatt | B62H 3/08 |
| 2018/0354571 A1 * | 12/2018 | Xie | B62H 3/00 |
| 2019/0366862 A1 | 12/2019 | Anton | |

FOREIGN PATENT DOCUMENTS

| | | | | |
|---|---|---|---|---|
| CN | 109018089 A | * | 12/2018 | ............... B62H 3/08 |
| DE | 202018105215 U1 | * | 11/2018 | |
| DE | 102019206861 A1 | * | 11/2020 | ........... G06Q 10/047 |
| EP | 2112307 | | 10/2009 | |
| EP | 2315192 A1 | * | 4/2011 | ............... B62H 3/04 |
| EP | 3222501 A1 | * | 9/2017 | |
| EP | 3578448 | | 12/2019 | |
| WO | WO-2009080566 A1 | * | 7/2009 | ............... B62H 3/00 |
| WO | WO-2019038644 A1 | * | 2/2019 | |

OTHER PUBLICATIONS

International Search Report and Written Opinion for International Application No. PCT/US2021/030201 (12 pages).

* cited by examiner

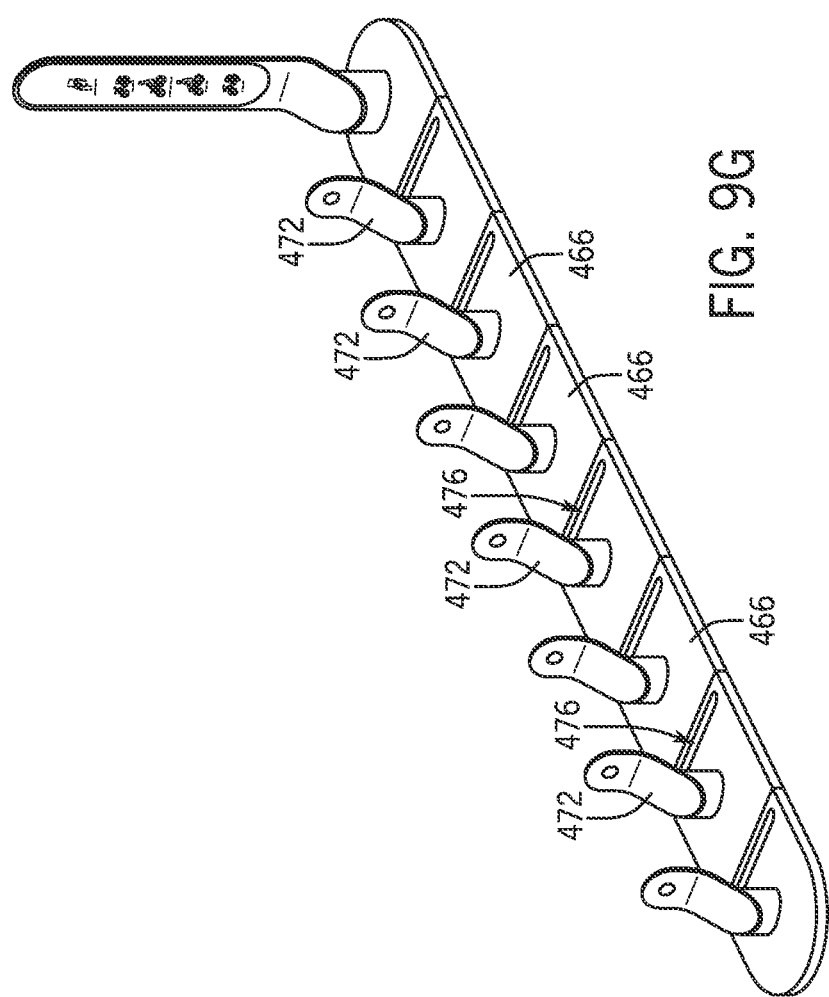

LIGHTWEIGHT DOCKING STATION FOR MICROMOBILITY TRANSIT VEHICLES SYSTEMS AND METHODS

CROSS REFERENCE TO RELATED APPLICATIONS

This continuation patent application claims priority to and claims the benefit of U.S. patent application Ser. No. 16/865,041 filed May 1, 2020, now U.S. Pat. No. 10,991,250, and entitled "Lightweight Docking Station for Micromobility Transit Vehicles Systems and Methods," which is hereby incorporated by reference in its entirety for all purposes.

TECHNICAL FIELD

One or more embodiments of the present disclosure relate generally to micromobility transit vehicles and more particularly, for example, to systems and methods for a lightweight docking station for one or more micromobility transit vehicles.

BACKGROUND

Parking (or docking) stations for micromobility vehicles for hire (e.g., shared scooters, sit-scooters, bicycles, etc.) are robust and represent a significant investment for a ridesharing company. These and other considerations limit the amount of parking stations that can be placed within a municipality or region. Legacy parking stations may also need to be updated with new or updated technology and/or features. At times, legacy parking stations go "offline" due to many factors, including loss of signal, disconnection from a central server, a dead battery, and dock mismatch, among others. In such situations, a rider may not be able to end their ride for hire at an offline station, leading to the rider being "stuck in ride" and not being able to take a subsequent ridesharing ride. In addition, a potential rider may approach an offline station and become frustrated with not being able to unlock and/or remove a micromobility vehicle for hire. Also, private micromobility vehicles are often locked to private parking stations owned by the ridesharing company, overcrowding the parking stations and sometimes preventing a rider from properly parking/locking a micromobility vehicle for hire at the parking stations.

Therefore, there is a need in the art for systems and methods for a lightweight docking station that addresses the deficiencies noted above, other deficiencies known in the industry, or at least offers an alternative to current techniques. For example, improvements are needed to identify and notify ridesharing users of offline docking stations, reserve or rent micromobility vehicles only from online docking stations, navigate ridesharing users to only online docking stations, limit the vehicles that can be parked/locked at the docking stations, and the like.

SUMMARY

Techniques are disclosed for systems and methods associated with lightweight docking stations for micromobility transit vehicles. In accordance with one or more embodiments, a multimodal transportation system is provided. The multimodal transportation system may include one or more docking stations, a non-transitory memory having instructions stored therein, and one or more hardware processors configured to execute the instructions to execute operations. The one or more docking stations may include one or more racks configured to secure one or more micromobility transit vehicles. The operations may include identifying at least one rack from the one or more racks is available for docking the one or more micromobility transit vehicles and communicating with a mobile computing device to display an indication of the at least one rack available for docking the one or more micromobility transit vehicles.

In accordance with one or more embodiments, a docking station is provided. The docking station may include one or more racks configured to dock one or more vehicles, a lock hole in a rack plate of the one or more rack, and a base. The lock hole may be configured to align with a respective locking device of each of the one or more vehicles. The base may be configured to elevate the one or more vehicles to align the respective locking device with the lock hole.

In accordance with one or more embodiments, a method of determining a docking availability at one or more docking stations including one or more racks configured to secure one or more micromobility transit vehicles is provided. The method may include identifying at least one rack from the one or more racks is available for docking the one or more micromobility transit vehicles and communicating with a mobile computing device to display an indication of the at least one rack available for docking the one or more micromobility transit vehicles.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 9G illustrates another diagram of the docking station of FIG. 8 in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
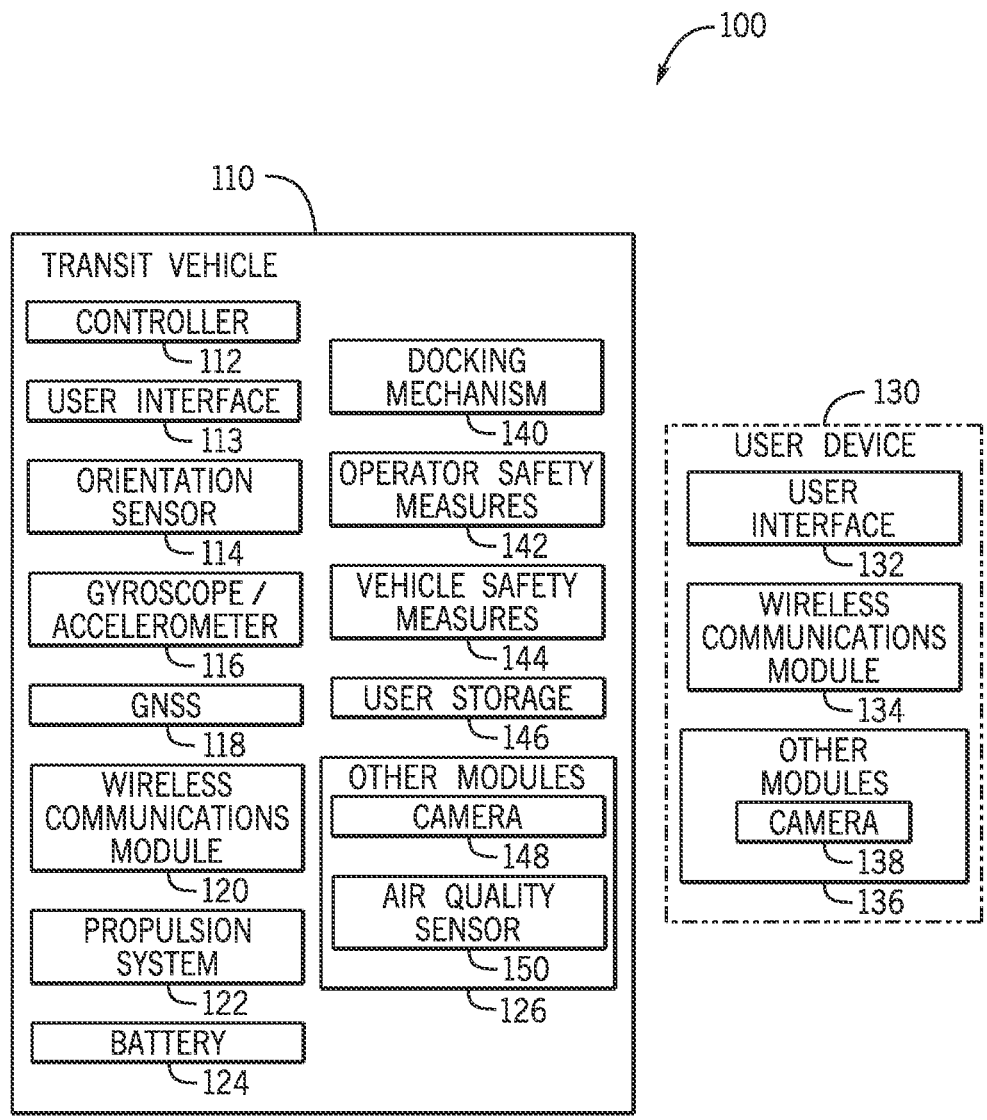
FIG. 1 illustrates a block diagram of a portion of a dynamic transportation matching system including a transit vehicle in accordance with an embodiment of the disclosure.

In accordance with various embodiments of the present disclosure, a "lightweight" docking station can be placed in a greater number of locations due to its smaller footprint, form factor, visual weight (e.g., a visual mass, a visual impact, or a visual characteristic of attracting and interacting with an observer's eye or vision), or any combination thereof compared to legacy stations in the industry. As described herein, "lightweight" refers to a comparatively smaller size, robustness, weight, visual weight, or any combination thereof. The docking station includes one or more docks in which to position a micromobility transit vehicle (e.g., kick scooter, sit-scooter, bicycle, etc.). Once the micromobility transit vehicle is in position, the micromobility transit vehicle may be locked to the dock, such as passing a cable around a portion of the dock. Optionally, the dock may be shaped or sized to correspond with a locking structure or device of the micromobility transit vehicle. For instance, the dock may include a unique shape or size such that only a certain type of micromobility transit vehicle may be locked to the dock. The docking station may include one or more smart features, such as one or more modules configured to determine the type of micromobility transit vehicle locked to the docking station, how many micromobility transit vehicles are in the docking station, how many docks are available in which to park a micromobility transit vehicle, and if the micromobility transit vehicle is parked correctly in the dock, among others. The docking station may also include charging capabilities and may be modular to tailor the docking station to a location, requirement, or the like.

In addition, various embodiments of the present disclosure include an in-app experience that interfaces with the lightweight docking station and alleviates one or more problems associated with offline stations. For example, an application (or app) running on a computing device of a transportation requester may utilize application logic to reserve a micromobility transit vehicle available at an online station and navigate the transportation requester to the online station. During the ride for hire, the app logic may navigate the transportation requester or rider to another online station that is near the rider's destination and includes an available dock (i.e., a destination station). Once locked to the destination station, the micromobility transit vehicle may be paired to a sensor, such as passively, at the destination station, and the status of the destination station may be updated for future rides and/or other riders.

In lieu of reserving a micromobility transit vehicle, the app logic may show, such as dynamically, the docking stations near the user and their status (e.g., online, offline, available parking spots, available vehicles, etc.), allowing the transportation requester to check ride availability. Similarly, while in-ride, the app logic may show, such as dynamically, the docking stations near the rider and their status, allowing the rider to check parking availability. The app logic may filter the available docking stations based on a desired vehicle to rent or based on the actual vehicle being ridden (e.g., sit-scooter vs bicycle availability, parking availability, etc.). The app logic may also give alternatives to the transportation requester or rider as the status of a docking station changes (e.g., status changes from online to offline, from offline to online, etc.). The app logic may also warn the rider if the rider has parked a micromobility transit vehicle at an offline station.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
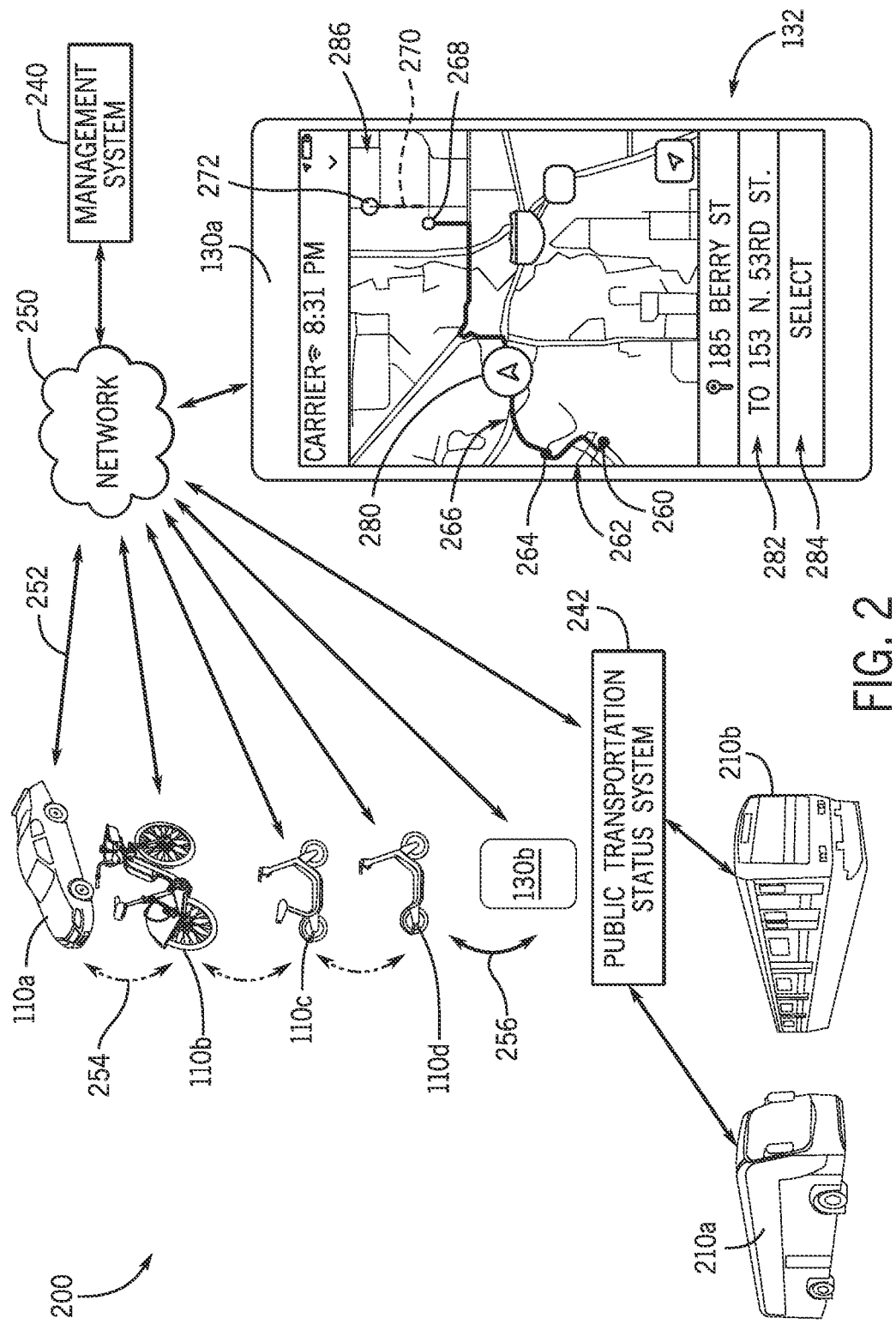
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
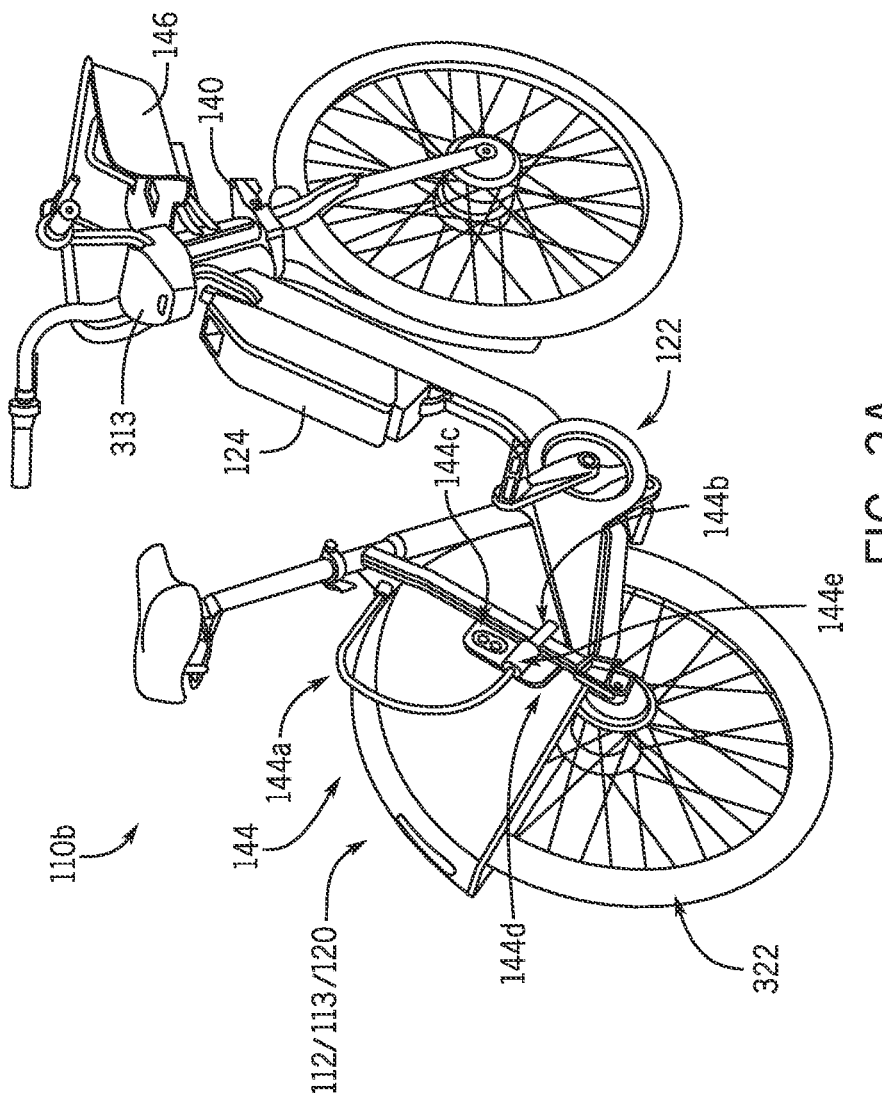
FIGS. 3A-C illustrate diagrams of micromobility transit vehicles for use in a dynamic transportation matching system in accordance with an embodiment of the disclosure.
Figure 3B:
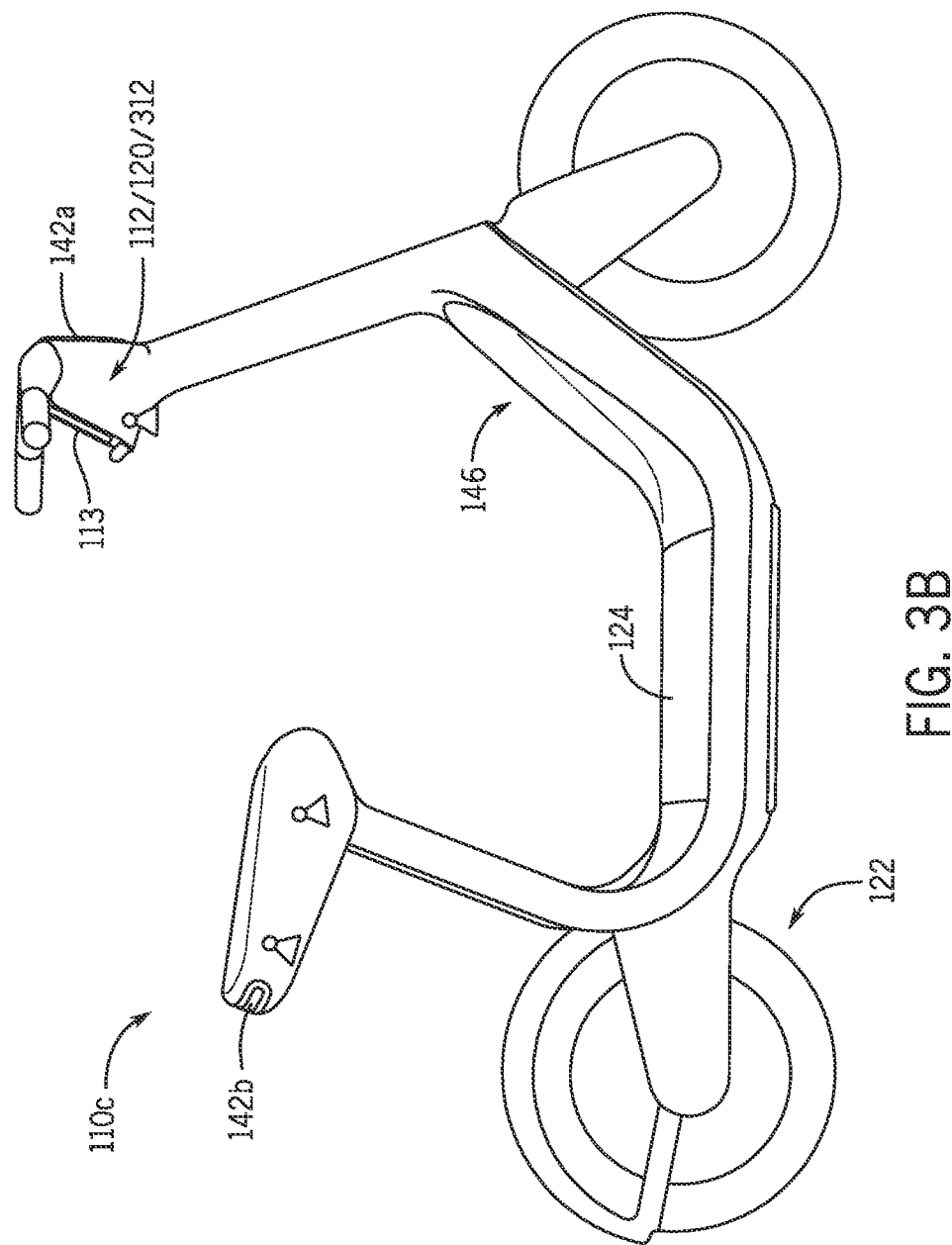
Figure 3C:
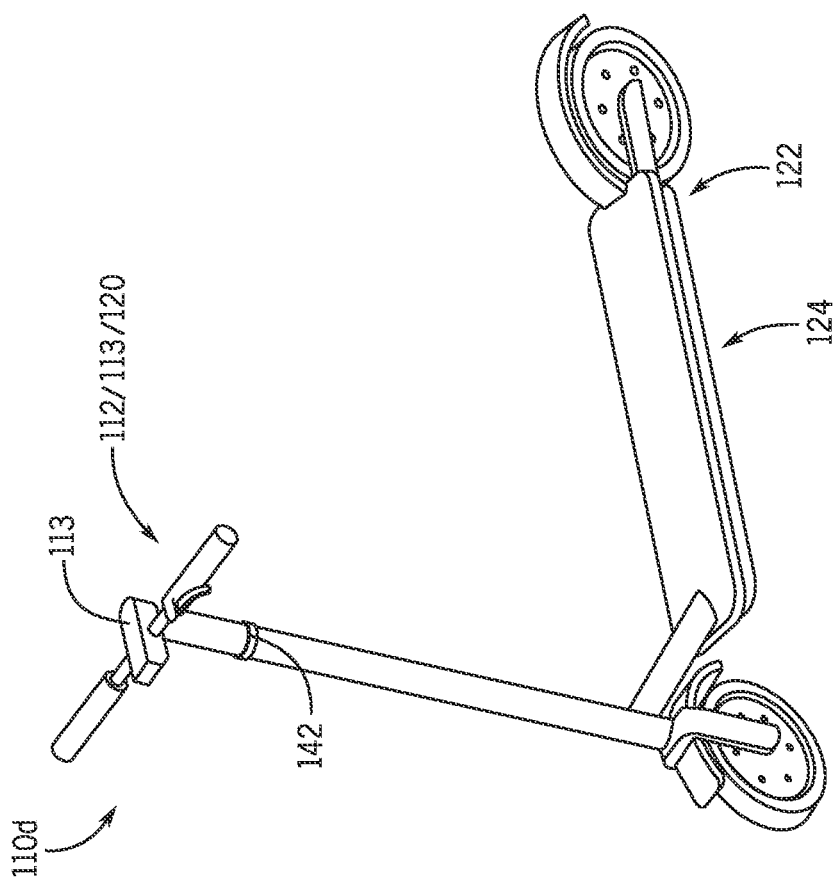

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In some embodiments, the vehicle security device 144, such as one or more components of the vehicle security device 144, may be similar to the integrated lock described in U.S. Pat. No. 10,577,834 B1, entitled "SYSTEMS AND METHODS FOR MAGNET-EQUIPPED LOCKS," which is incorporated herein in its entirety for all purposes. In various embodiments, vehicle security device 144 may be configured to immobilize transit vehicle 110b by default, thereby requiring a transportation requester or rider to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
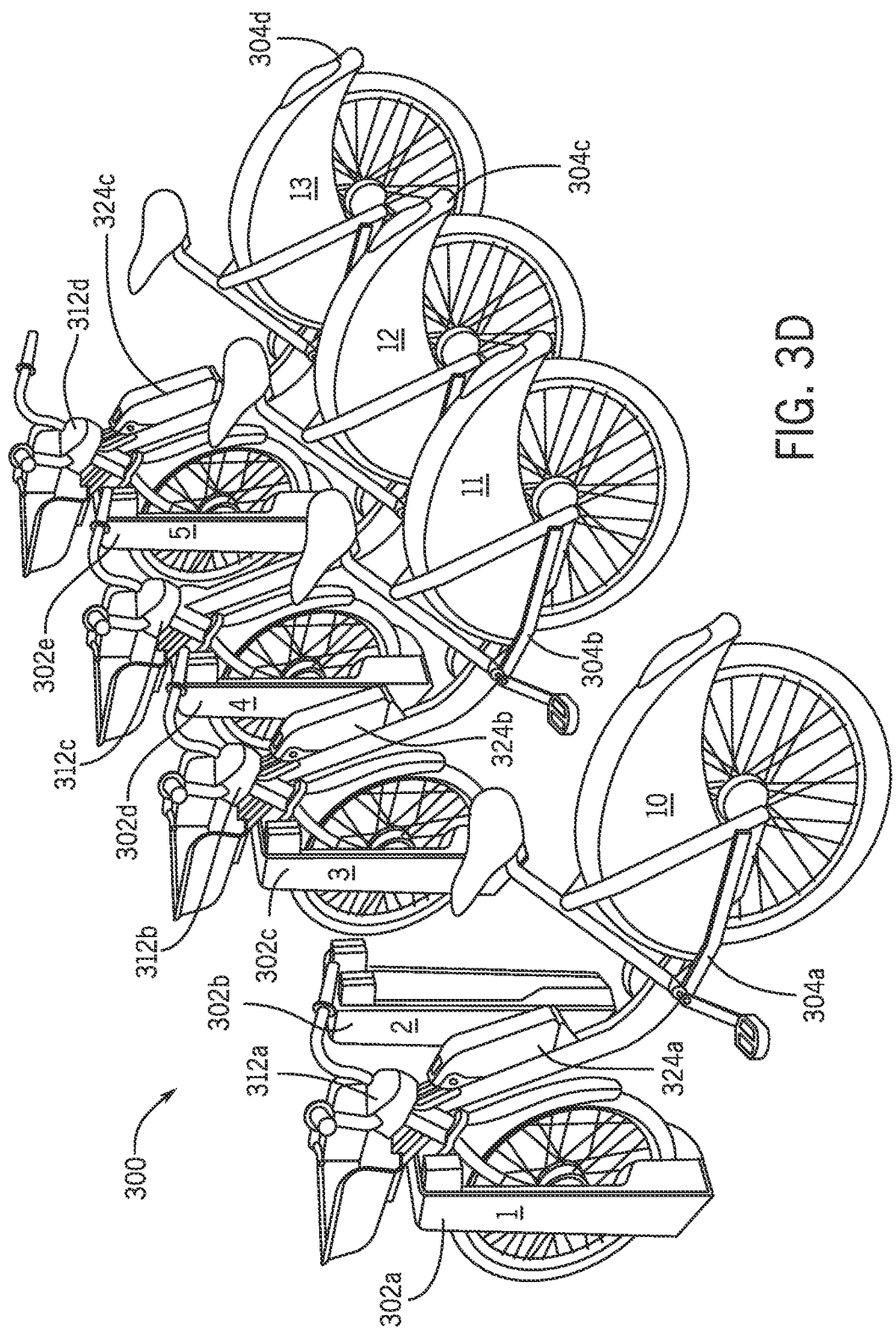
FIG. 3D illustrates a diagram of a first docking station for docking one or more micromobility transit vehicles in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A transportation requester or rider may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110*b-d* based on the unlock signal. In some embodiments, each of the docks 302*a-e* may also be configured to charge batteries (e.g., batteries 324*a-c*) of the electric bicycle 304*a-d*, respectively, when the electric bicycle 304*a-d* are docked at the docks 302*a-e*. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
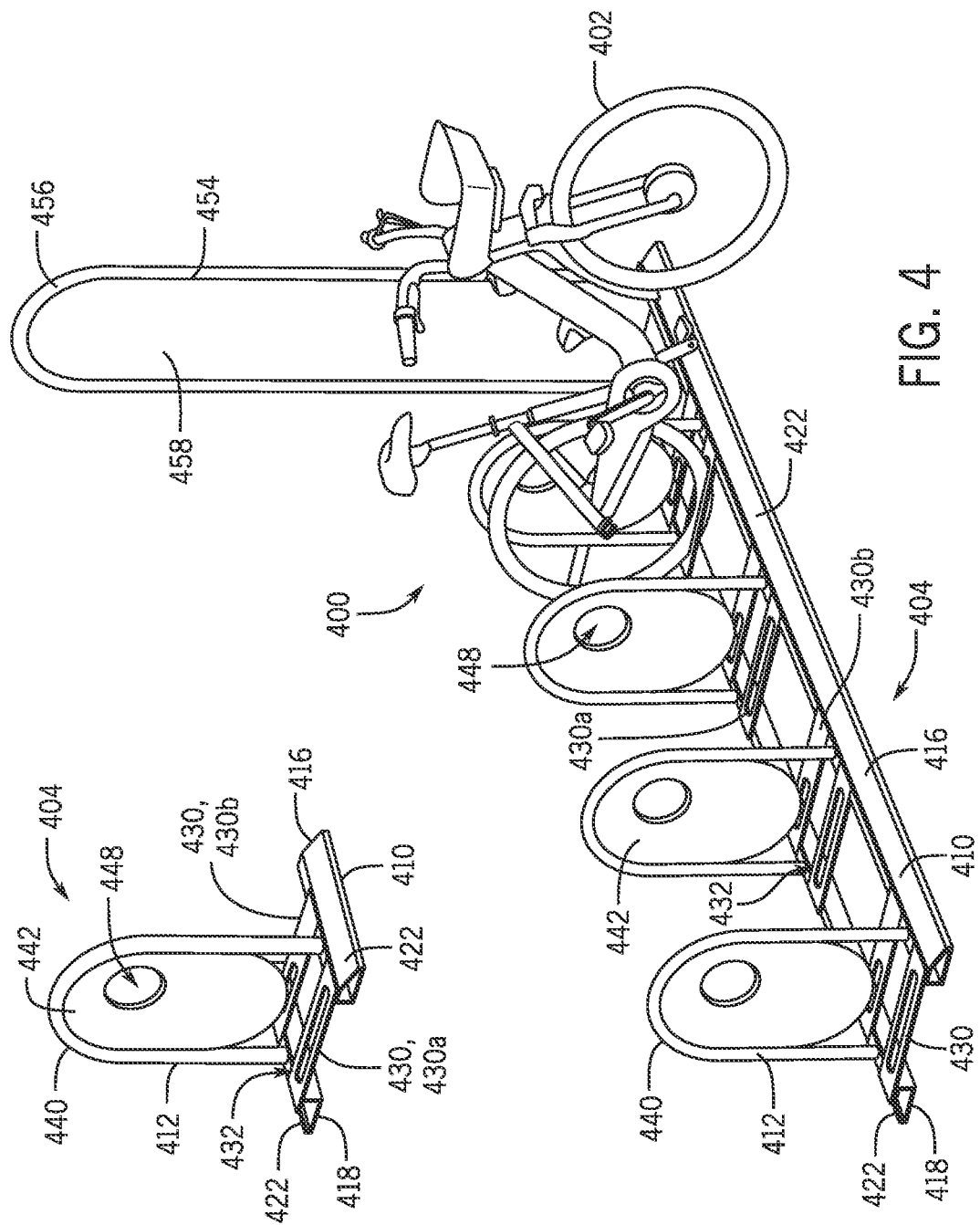
FIG. 4 illustrates a diagram of a second docking station for docking one or more micromobility transit vehicles in accordance with an embodiment of the disclosure.

FIG. 4 illustrates a diagram of a docking station 400 for docking one or more micromobility transit vehicles (e.g., micromobility transit vehicle 402) in accordance with an embodiment of the disclosure. Depending on the application, the micromobility transit vehicle 402 may be similar to any one of transit vehicles 110*b*, 110*c*, or 110*d*, described above. Similar to docking station 300, the docking station 400 may include one or more racks 404 or docks in which to park one or more micromobility transit vehicles 402. For example, the docking station 400 may include multiple racks 404 each configured to receive one or more micromobility transit vehicles 402, as explained more fully below.

As described herein, the docking station 400 may include a lightweight characteristic. For example, the docking station 400 may include a smaller footprint, form factor, visual weight, among others, or any combination thereof compared to legacy stations. Visual weight may refer to the docking station's visual mass, visual impact, or visual characteristic of attracting and interacting with an observer's eye or vision (e.g., how much an observer's eye thinks the docking station weighs, the visual effect of pulling an observer's eye, etc.). The lightweight characteristic may allow the docking station 400 to be installed or placed in a greater number of locations compared to legacy stations. For instance, the lightweight characteristic (e.g., smaller footprint, form factor, and/or visual weight) may allow the docking station 400 to be installed or placed in areas with smaller size constraints. In addition, the lightweight characteristic (e.g., smaller footprint, form factor, and/or visual weight) may satisfy the design guidelines of a greater number of municipalities, and may appeal more to the public and/or transportation requesters or riders, compared to legacy stations.

The lightweight characteristic may be the result of many configurations. For instance, the docking station 400 may include a smaller number of parts, similar elements with smaller dimensions/weight, one or more parts having a combination of features, or any combination thereof compared to legacy stations. In some embodiments, the lightweight characteristic may be the result of the overall design of the docking station 400 or the components themselves. For example, one or more structures of the docking station 400 may be minimized in size and/or shape while still providing adequate strength for securing micromobility transit vehicle 402, preventing theft of the micromobility transit vehicle 402, etc. In one embodiment, the material type may be selected to provide a lightweight characteristic (e.g., lightweight metal type, smaller gauge material, perforations, and/or strategically placed cutouts or reliefs, etc.).

In some embodiments, the docking station 400 may be modular to tailor the docking station 400 to a location, requirement, locale-specific regulation, or the like. For example, multiple racks 404 may be connected to define the docking station 400 of a desired size (e.g., greater number of racks 404 connected to define a larger docking station 400 suited for a larger area, smaller number of racks 404 connected to define a smaller docking station 400 suited for a smaller area, etc.). In such embodiments, the racks 404 may be connected end-to-end until the docking station 400 has a desired size. The modularity of the docking station 400 may also allow one or more racks 404 to be added to or removed from the docking station 400, such as after initial installation or assembly, based on use, demand, changing requirements or regulations, or the like.

As shown, each rack 404 may include a base 410 and an anchor 412 extending from the base 410. The base 410 may be defined by a first bar 416 and a second bar 418 extending in a spaced relationship. For example, the first bar 416 and the second bar 418 may extend horizontally in a parallel relationship. The first bar 416 and the second bar 418 may be formed from an extruded material. The first bar 416 and the second bar 418 may include a profile providing a functional characteristic of the docking station 400. For example, the profile of the first bar 416 and the second bar 418 may be integrated with a ramp 422 to aid insertion of the micromobility transit vehicle 402 into the docking station 400, such as to facilitate the micromobility transit vehicle 402 riding up onto the base 410 of the docking station 400.

Extending between the first bar 416 and the second bar 418 may be one or more platforms 430 for receiving a portion of the micromobility transit vehicle 402. For instance, each platform 430 may include a tire recess 432 for receiving a portion of a tire of micromobility transit vehicle 402 (e.g., the rear tire of a bicycle, the front tire of a scooter or sit-scooter, etc.). The tire recess 432 may be defined as a cutout, depression, or hole in the platform 430. In such embodiments, the tire recess 432 may be defined to properly position the micromobility transit vehicle 402 within the rack 404. For example, when the tire of the micromobility transit vehicle 402 is received within the tire recess 432 of the platform 430, the micromobility transit vehicle 402 may be positioned properly to lock the micromobility transit vehicle 402 to the anchor 412, as described below. For example, the tire recess 432 may center the tire of the micromobility transit vehicle 402 between the first bar 416 and the second bar 418 or position the tire of the micromobility transit vehicle 402 closer to one of the first bar 416 and the second bar 418 to properly align the micromobility transit vehicle 402 with the anchor 412.

In one embodiment, the one or more platforms 430 may include a first platform 430*a* for receiving a first vehicle type, a second platform 430*b* for receiving a second vehicle type, and so on. For instance, the first platform 430*a* may be configured to receive a tire of a bicycle (e.g., transit vehicle 110*b*), the second platform 430*b* may be configured to receive a tire of a sit-scooter (e.g., transit vehicle 110*c*), and so on. In such embodiments, the first platform 430*a* and the second platform 430*b* may be distinguished by the size and shape of their respective cutouts 432. For instance, the tire recess 432 of the first platform 430*a* may be larger in length and/or width to accommodate the specific size tire of the bicycle, and the tire recess 432 of the second platform 430*b* may be smaller in length and/or width to accommodate the specific size tire of the sit-scooter. As shown, the first platform 430*a* may extend on one side of the anchor 412, and the second platform 430*b* may extend on another side of the anchor 412, although other configurations are contemplated. In some embodiments, each of the first platform 430*a* and the second platform 430*b* may include multiple cutouts 432 for the different vehicle types.

The anchor 412 may include many configurations forming a support from which to lock the micromobility transit vehicle 402. For example, the anchor 412 may form a stanchion or other structure to which to lock the micromobility transit vehicle 402. As shown, the anchor 412 may extend uprightly (e.g., vertically) from the base 410. The anchor 412 may include tubing 440 and a rack plate 442 connected to the tubing 440, the tubing 440 extending around the rack plate 442 from the first bar 416 to the second bar 418. The tubing 440 and/or rack plate 442 may be configured to provide a lightweight characteristic of the docking station 400. For example, the rack plate 442 may be formed from a perforated sheet of material (e.g., round hole perforated metal) to lighten the physical and visual weight of the anchor 412. In one embodiment, the anchor 412 may include iconography for aiding a rider in docking the micromobility transit vehicle 402. For example, one side of the rack plate 442 may include iconography associated with the configuration of the first platform 430a (e.g., for receiving a first vehicle type), and the other side of the rack plate 442 may include iconography associated with the configuration of the second platform 430b (e.g., for receiving a second vehicle type).

The anchor 412 may have a geometry configured to interface with a locking device 444 of the micromobility transit vehicle 402. The locking device 444 may be similar to the vehicle security device 144, described above, such as being similar to the integrated lock described in U.S. Pat. No. 10,577,834 B1. Specifically, the locking device 444 may include a locking cable 446, a locking pin coupled to a free end of the locking cable 446, and a pin latch secured to the micromobility transit vehicle 402. The locking cable 446 may be similar to locking cable 144a, the locking pin may be similar to pin 144b, and the pin latch may be similar to pin latch 144c, described above. In general, to lock the micromobility transit vehicle 402, the locking cable 446 may be wrapped around and/or through a secure structure (e.g., pole, fence, bicycle rack, etc.) to engage the locking pin with the pin latch. The locking device 444 may be integrated with the micromobility transit vehicle 402. For example, the pin latch may be integrated with the frame, fender, or other portion of the micromobility transit vehicle 402. In one embodiment, the locking device 444 may be of a type specific to the micromobility transit vehicle 402. For instance, transit vehicle 110b may include a first locking device unique to its vehicle type, transit vehicle 110c may include a second locking device unique to its vehicle type, and transit vehicle 110d may include a third locking device unique to its vehicle type, such as unique in location, type, etc.

As shown, each rack 404 may include a lock hole 448 sized and shaped to align with the locking device 444 to permit locking of the micromobility transit vehicle 402 to the anchor 412. For example, a vertical position of the lock hole 448 within the rack plate 442 may be set at a height similar or identical to the height of the pin latch when the tire of the micromobility transit vehicle 402 is positioned within the tire recess 432 of the platform 430. Additionally, a lateral position of the lock hole 448 within the rack plate 442 may be set to align with the locking device 444 when the tire of the micromobility transit vehicle 402 is positioned within the tire recess 432 of the platform 430. In this manner, the lock hole 448 may align with the locking device 444 when the micromobility transit vehicle 402 is docked within the docking station 400. Once the locking device 444 is aligned with the lock hole 448, the locking cable 446 may be passed through the lock hole 448 to engage the locking pin with the pin latch through the lock hole 448 to lock the micromobility transit vehicle 402 to the anchor 412.

As shown, the lock hole 448 may be defined in the rack plate 442, although other configurations are contemplated. For example, the lock hole 448 may be defined at least partially by the tubing 440. In some embodiments, the lock hole 448 may be defined by or through other components of the rack 404. The lock hole 448 may be defined asymmetrically or symmetrically in the rack plate 442. For example, the lock hole 448 may be defined nearer one side of the anchor 412.

Each rack 404 may include one or more alignment features configured to align the lock hole 448 with a respective locking device 444 of each micromobility transit vehicle docked to the docking station 400. For example, the base 410 (e.g., the ramp 422 and/or platform 430) may be configured to elevate the micromobility transit vehicle 402 to align the locking device 444 of the micromobility transit vehicle 402 with the lock hole 448 (e.g., such that the pin latch aligns with the lock hole 448 to enable locking with the locking pin). In some embodiments, receipt of at least a portion of the tire of the micromobility transit vehicle 402 within the tire recess 432 may further align the locking device 444 of the micromobility transit vehicle 402 with the lock hole 448. In this manner, the ramp 422 and/or platform 430 may vertically align the locking device 444 of the micromobility transit vehicle 402 with the lock hole 448 and the tire recess 432 may laterally align the locking device 444 of the micromobility transit vehicle 402 with the lock hole 448.

Should the micromobility transit vehicle 402 be improperly positioned within the rack 404 (e.g., improperly positioned on the platform or positioned on a platform meant for a different vehicle type), the lock hole 448 will not align with the locking device 444 and the micromobility transit vehicle 402 may not be locked to the docking station 400. In addition, the interface between the lock hole 448 and the locking device 444 may limit undesired locking of third-party vehicles to the docking station 400. For example, the position of the lock hole 448 within the rack plate 442 may prevent use of a U-lock to lock an unwanted third-party vehicle to the docking station 400. As such, the geometry of the rack 404 may promote proper locking of the micromobility transit vehicle 402 to the docking station 400, limit undesired locking of unwanted vehicles to the docking station 400, or otherwise provide a desired characteristic of the docking station 400.

The docking station 400 may be positioned for a desired sighting and/or layout. For instance, the docking station 400 may be positioned within or near the curb of a street for parklet sighting/parking. In such embodiments, the micromobility transit vehicle 402 may be parked nose in towards the curb, with the micromobility transit vehicle 402 removed from the docking station 400 by backing up into the street. In some embodiments, the docking station 400 may be positioned on the sidewalk near a building or other structure for sidewalk sighting/parking. In such embodiments, the micromobility transit vehicle 402 may be parked nose in towards the building or structure, with the micromobility transit vehicle 402 removed from the docking station 400 by backing up into the sidewalk. In some embodiments, the racks 404 may be configured to allow or promote bi-directional parking or directional parking. For example, the configuration of the lock hole 448 and tire recess 432 may only allow the micromobility transit vehicle 402 to be parked in one direction relative to the rack 404 (such as to promote the parklet or sidewalk sighting/parking described above or to reduce vehicle congestion within the docking station 400). In other embodiments, the lock hole 448 and tire recess 432 configuration may allow bi-directional parking to increase parking capacity at each docking station 400.

Figure 5:
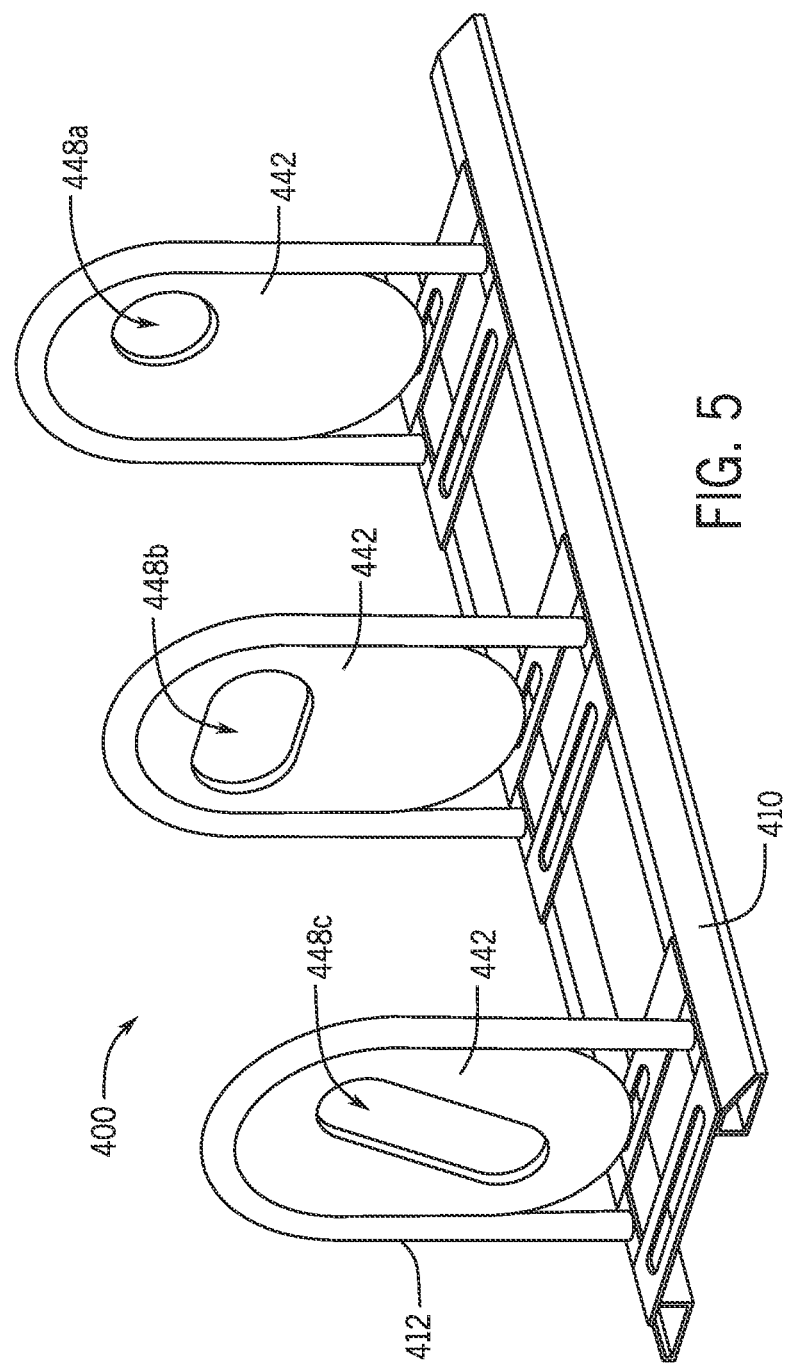
FIG. 5 illustrates a diagram of alternative geometries for the docking station of FIG. 4 in accordance with an embodiment of the disclosure.

FIG. 5 illustrates a diagram of alternative geometries for the docking station 400 in accordance with an embodiment of the disclosure. As shown in FIG. 5, the lock hole 448 may include many configurations. In one embodiment, the lock hole 448 may have a size and shape unique to the type of vehicle to be locked to the docking station 400. For example, lock hole 448a may be circular or substantially circular to align or otherwise interface with the locking device 444 of a first vehicle type (e.g., transit vehicle 110b). Lock hole 448b may be pill shaped and extend horizontally along the rack plate 442 to align or otherwise interface with the locking device 444 of a second vehicle type (e.g., a tandem bike). In some embodiments, lock hole 448c may be pill shaped but extend diagonally along the rack plate 442 to align or otherwise interface with the locking device 444 of a third vehicle type (e.g., transit vehicle 110c or 110d). In some embodiments, the lock hole 448 may have a size and/or shape unique to multiple vehicle types. For example, in addition to accommodating the third vehicle type, the diagonal pill-shaped lock hole 448c may also accommodate the first vehicle type. In this manner, the lock hole 448 may be configured to align with the locking device 444 of at least two vehicle types.

Figure 6:
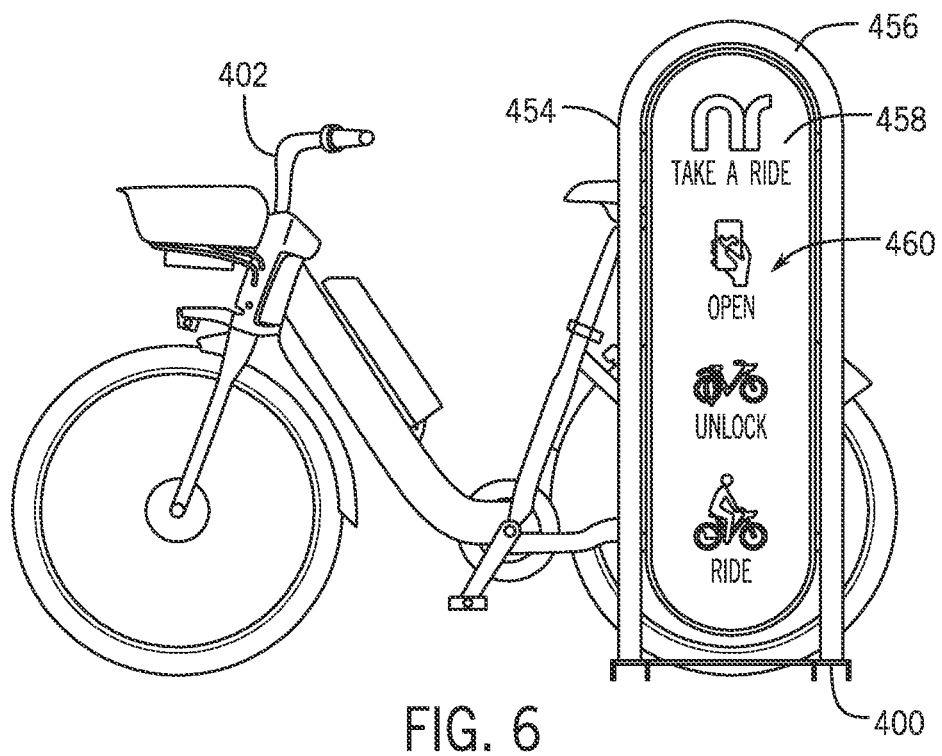
FIG. 6 illustrates a diagram of a first side of a beacon of the docking station of FIG. 4 in accordance with an embodiment of the disclosure.
Figure 7:
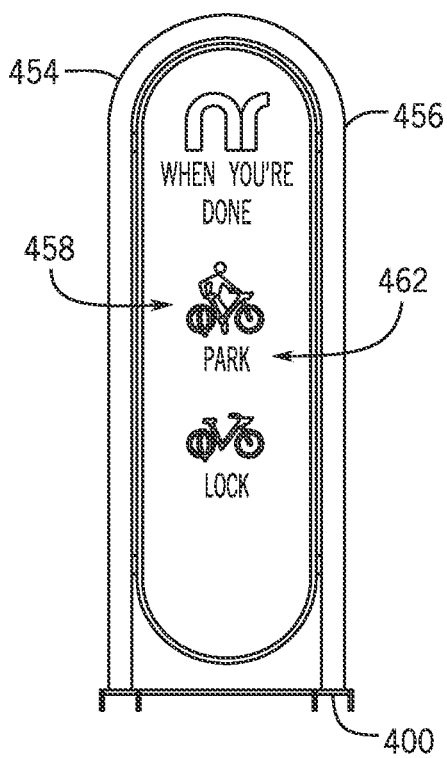
FIG. 7 illustrates a diagram of a second side of the beacon of FIG. 6 in accordance with an embodiment of the disclosure.

FIG. 6 illustrates a diagram of a first side of a beacon 454 of the docking station 400 in accordance with an embodiment of the disclosure. FIG. 7 illustrates a diagram of a second side of the beacon 454 in accordance with an embodiment of the disclosure. Referring to FIGS. 6 and 7, the beacon 454 may be formed as a panel, sign, or other structure visually distinguishing or setting off the docking station 400. The beacon 454 may be similar to the anchor 412 described above. For example, the beacon 454 may include tubing 456 surrounding a panel 458. The beacon 454 may include a design similar to the anchor 412. For example, the beacon 454 may include similar curvatures, form factor, visual weight, or the like. As shown in FIG. 4, the beacon 454 may include a width similar or identical to the anchor 412 but a height greater than the anchor 412. In this manner, the beacon 454 may be a visually distinguishing feature of the docking station 400 to facilitate identification or location of the docking station 400.

Referring to FIGS. 6 and 7, the beacon 454 may have a first side 460 (see FIG. 6) and a second side 462 (see FIG. 7). The first side 460 may be a front side and face away from the micromobility transit vehicle 402 in the docking station 400 (e.g., facing oncoming traffic). The second side 462 may be a back side and face the micromobility transit vehicle 402 in the docking station 400. The first side 460 and the second side 462 may include instructions and/or iconography related to use of the docking station 400 and/or the micromobility transit vehicle 402. The first side 460 and the second side 462 may include the same or different instructions/iconography. For instance, the first side 460 may include one or more instructions or tips related to unlocking the micromobility transit vehicle 402 from the docking station 400 and/or riding the micromobility transit vehicle 402. The second side 462 may include one or more instructions or tips related to parking the micromobility transit vehicle 402 and/or locking the micromobility transit vehicle 402 to the docking station 400. In this manner, the front side may be visible to and/or designed for a transportation requester or rider as the transportation requester/rider approaches the docking station 400 to use the micromobility transit vehicle 402. In like manner, the second side 462 may be visible to and/or designed for the transportation requester or rider as the transportation requester/rider approaches the docking station 400 to park the micromobility transit vehicle 402.

The docking station 400 may include other features. For example, the docking station 400 may include one or more sensors configured to electronically couple one or more micromobility transit vehicles 402 to the docking station 400. The sensor(s) may passively communicate with one or more electronics or electronic devices of the micromobility transit vehicles 402. In such embodiments, the passive sensor(s) of the docking station 400 may passively pair with one or more micromobility transit vehicles 402 when docked in the docking station 400. This pairing may allow the docking station 400 (or other component of system 100 or system 200) to determine or detect how many micromobility transit vehicles 402 are parked in the docking station 400, what type of micromobility transit vehicles 402 are parked in the docking station 400, how many of each type of micromobility transit vehicle 402 is parked in the docking station 400, how many parking spots are available in the docking station 400, how many parking spots are available for each type of micromobility transit vehicle 402, how many micromobility transit vehicles 402 are parked properly in the docking station 400, how many micromobility transit vehicles 402 are improperly parked in the docking station 400, or the like. Such determinations may be communicated to other components of system 100 or system 200, such as to user device 130, management system 240, or the like.

The pairing between the docking station 400 and the micromobility transit vehicle 402 may occur via many communication protocols. For example, the micromobility transit vehicle 402 may be paired to the docking station 400 through radio-frequency identification, near-field communication, or Bluetooth technologies, among others. Depending on the application, the micromobility transit vehicle 402 may be paired to the docking station 400 generally or to the individual rack 404 of the docking station 400 at which the micromobility transit vehicle 402 is parked. Pairing of the micromobility transit vehicle 402 to an individual rack 404 of the docking station 400 may allow the docking station 400 (or other component of system 100 or system 200) to determine or detect how many micromobility transit vehicles 402 are parked in each rack 404, what type of micromobility transit vehicles 402 are parked in each rack 404, how many of each type of micromobility transit vehicle 402 is parked in each rack 404, how many parking spots are available in each rack 404, how many parking spots are available for each type of micromobility transit vehicle 402 in each rack 404, how many micromobility transit vehicles 402 are parked properly in each rack 404, how many micromobility transit vehicles 402 are improperly parked in each rack 404, or the like. Such determinations may be communicated to other components of system 100 or system 200, such as to user device 130, management system 240, or the like.

Like docking station 300, docking station 400 may be configured to charge the micromobility transit vehicle 402. For example, the docking station 400 may include one or more chargers, such as one or more chargers at each rack 404, each configured to charge one or more batteries of the micromobility transit vehicle 402. In some embodiments, the charge status of each micromobility transit vehicle 402 docked at docking station 400 may be communicated to the docking station 400 or other component of system 100 or system 200 (e.g., to user device 130, management system 240, or the like).

The docking station 400 may function similar to docking station 300. For instance, a request may be generated and sent to the docking station 400 to use a micromobility transit vehicle 402 that is docked in one of the racks 404 of the docking station 400. The request may be transmitted to management system 240, such as from user device 130. Once the request is processed, management system 240 may transmit an unlock signal to the micromobility transit vehicle 402 docked in the docking station 400 and/or the docking station 400 via network 250. The micromobility transit vehicle 402 may automatically disengage the locking device 444 to unlock the micromobility transit vehicle 402 based on the unlock signal.

The various communications and links between the docking station 400 and the micromobility transit vehicle 402 or other component of system 100 or system 200 may require the docking station 400 to be "online." As described herein in one embodiment, an online docking station is one that is powered on, fully functioning, and able to communicate with the micromobility transit vehicle 402 or other component of system 100 or system 200 (e.g., to user device 130, management system 240, or the like). In other embodiments, the docking station may still be online even if not fully functioning, such as when a certain feature that does not affect the parking or docking described herein is not functioning. Conversely, the docking station 400 may go "offline" due to many factors, including loss of signal, disconnection from a communications link (e.g., network 250), a dead battery or disconnection from a power source, or dock mismatch, among others. As described herein, an offline docking station is one that is powered off, malfunctioning (either with any feature or only to features needed for the parking or docking described herein), or unable to communicate with the micromobility transit vehicle 402 or other component of system 100 or system 200 (e.g., with user device 130, management system 240, or the like). In some embodiments, a status of the docking station 400 may be communicated to the micromobility transit vehicle 402 or another component of system 100 or system 200 (e.g., to user device 130, management system 240, or the like).

Figure 8:
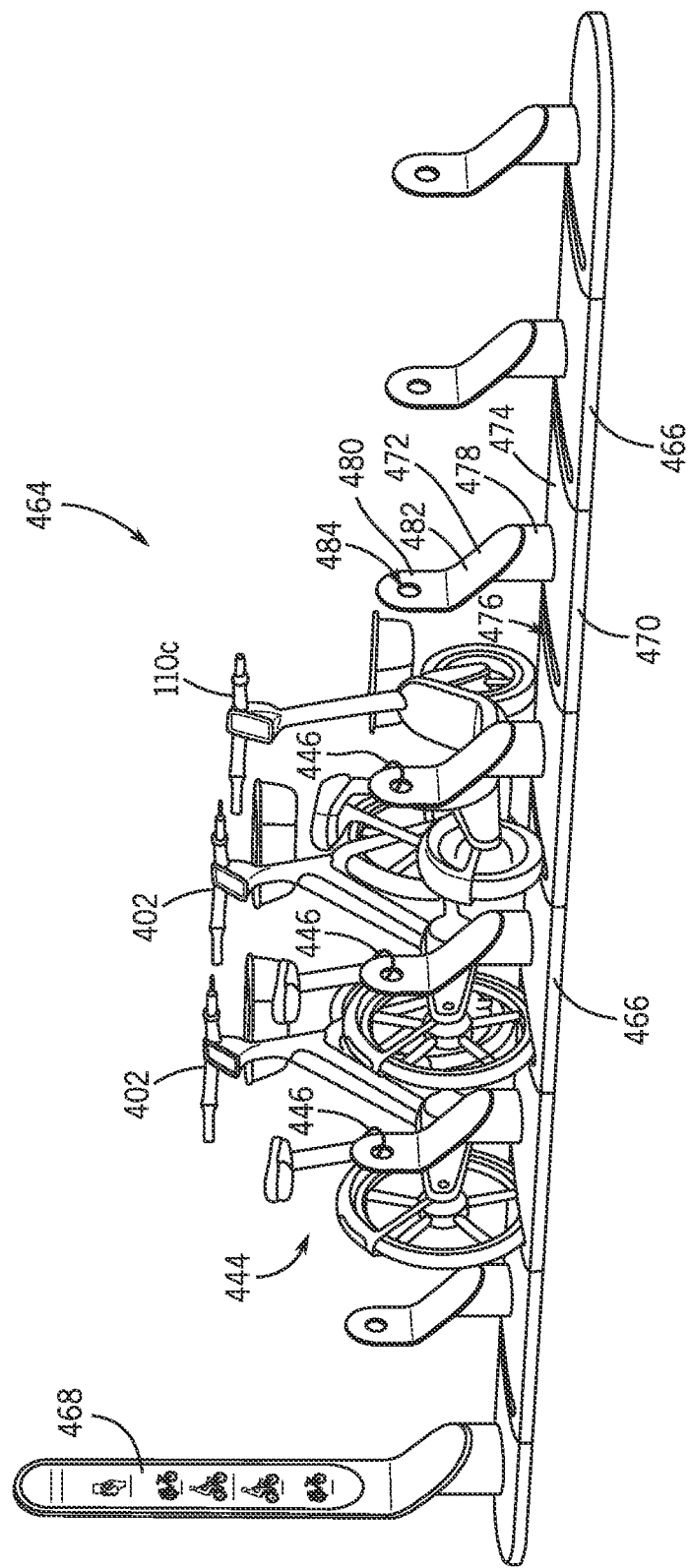
FIG. 8 illustrates a diagram of a third docking station for docking one or more micromobility transit vehicles in accordance with an embodiment of the disclosure.

FIG. 8 illustrates a diagram of a docking station 464 for docking one or more micromobility transit vehicles (e.g., any one of micromobility transit vehicles 110*b*, 110*c*, 110*d*, or 402) in accordance with an embodiment of the disclosure. Unless otherwise noted below, the docking station 464 may be similar to docking station 400, described above, or vice versa. Accordingly, descriptions of like features may be omitted for sake of clarity.

Similar to docking station 400, the docking station 464 may include one or more racks 466 or docks in which to park one or more micromobility transit vehicles, such as multiple racks 466 each configured to receive one or more micromobility transit vehicles. The racks 466 may be similar to the racks 404 described above, or vice versa. For example, the racks 466 may be modular to tailor the docking station 464 to a location, requirement, locale-specific regulation, or the like. Each rack 466 may be identical or substantially identical and connectable end-to-end until a desired size of the docking station 464 is achieved. Positioned along the one or more racks 466 may be a beacon 468, similar to beacon 454 described above, to facilitate identification or location of the docking station 464.

Each rack may include a base 470 and an anchor 472 extending from the base 470 to secure a micromobility transit vehicle. The base 470 may include a platform 474 to which the anchor 472 is secured or attached. As shown, the platform 474 may be generally flat and may include a tire recess 476 for receiving a portion of a tire of a micromobility transit vehicle to locate the micromobility transit vehicle within the rack 466, such as in a manner described above. For example, receipt of the micromobility transit vehicle's tire within the tire recess 476 may elevate and/or laterally align the locking device 444 of the micromobility transit vehicle with the anchor 472, as explained below.

The anchor 472 may include a post 478 extending from the base 470 and a rack plate 480 extending from the post 478. In some embodiments, the anchor 472 may include an intermediate plate 482 extending between the post 478 and the rack plate 480. For example, the intermediate plate 482 may extend angularly from the post 478 to the rack plate 480 to properly position the rack plate 480 in relation to a micromobility transit vehicle, although other configurations are contemplated. The rack plate 480 may include a lock hole 484 sized and shaped to align with the locking device 444 of a micromobility transit vehicle when the micromobility transit vehicle is docked within the rack. For example, a vertical and/or lateral position of the lock hole 484 may be set to align with the locking device 444 of the micromobility transit vehicle when the tire of the micromobility transit vehicle is positioned within the tire recess 476 of the platform 474. Once the locking device 444 is aligned with the lock hole 484, the locking cable 446 may be passed through the lock hole 484 to engage the locking device 444 through the lock hole 484 to lock the micromobility transit vehicle to the anchor 472.

The beacon 468 may have a size and/or shape similar to the anchor 472. For example, the beacon 468 may be similarly shaped but taller and/or wider to visually distinguish the beacon 468 from the anchor 472 and/or identify the docking station 464. The beacon 468 may be similar to beacon 454 described above, such as including instructions and/or iconography related to use of the docking station 464 and/or micromobility transit vehicles in general or parked therein.

Figure 9A:
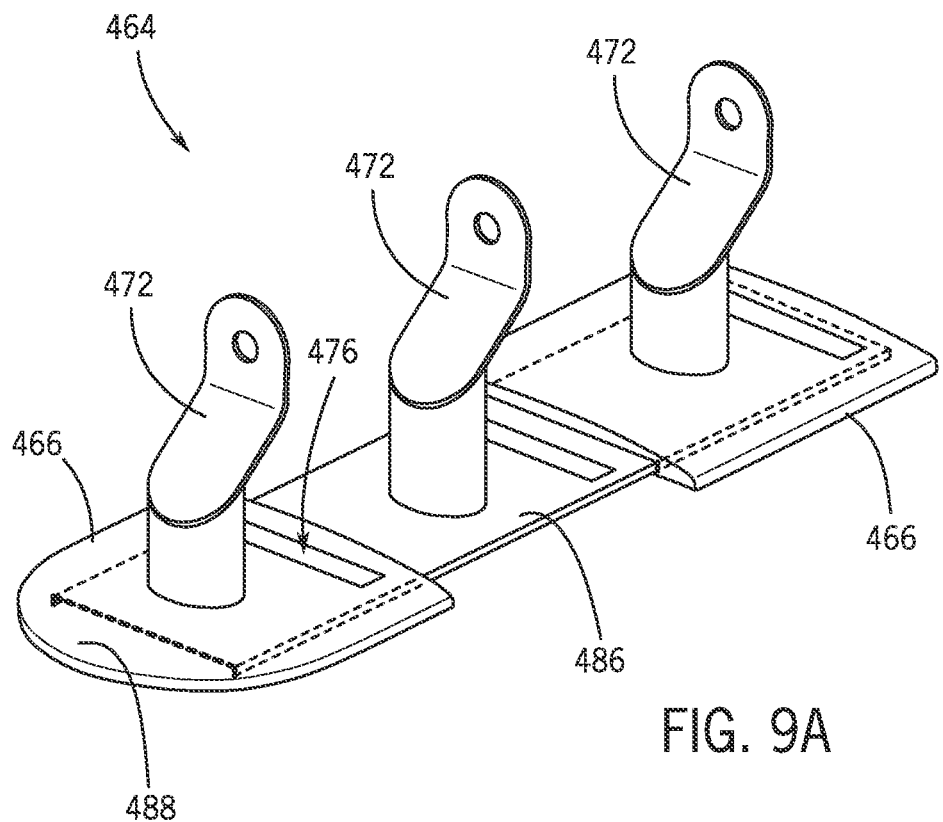
FIG. 9A illustrates a diagram of a partially cut-away view of the docking station of FIG. 8 in accordance with an embodiment of the disclosure.

FIG. 9A illustrates a diagram of a partially cut-away view of the docking station 464 in accordance with an embodiment of the disclosure. Referring to FIG. 9A, the base 470 may include a substructure 486 and a mat 488 surrounding the substructure 486. The anchor 472 may be attached or secured to the substructure 486 to provide sufficient strength and rigidity to the anchor 472. The substructure 486 may be formed from metal and may be defined as a plate-like structure. The mat 488 may be a rubber mat molded around the substructure 486. Depending on the application, the tire recess 476 may be defined with the mat 488 or within both the mat 488 and the substructure 486. The mat 488 and substructure 486 may define a thickness of the base 470, with edges of the mat 488 providing a ramp-like feature to aid insertion of a micromobility transit vehicle into the docking station 464, such as to facilitate the micromobility transit vehicle riding up onto the base 470 and into the tire recess 476. In this manner, the mat 488 and/or substructure 486 may provide the elevational and/or lateral positioning of the micromobility transit vehicle described above to align the locking device 444 of the micromobility transit vehicle with the lock hole 484.

Figure 9B:
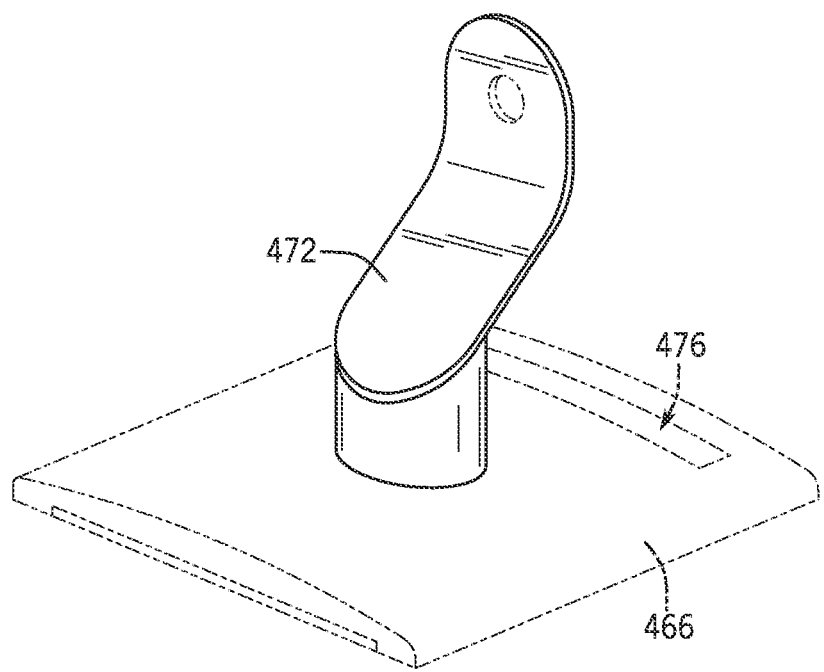
FIG. 9B illustrates a top, front, right perspective view of an anchor for a docking station and showing some features in dotted lines in accordance with an embodiment of the disclosure.
Figure 9C:
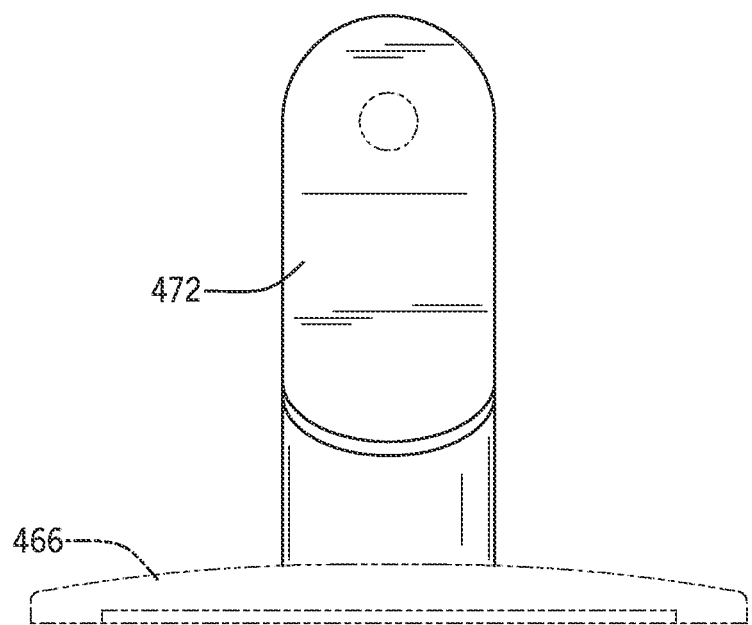
FIG. 9C illustrates a front elevation view of the anchor of FIG. 9B in accordance with an embodiment of the disclosure.
Figure 9D:
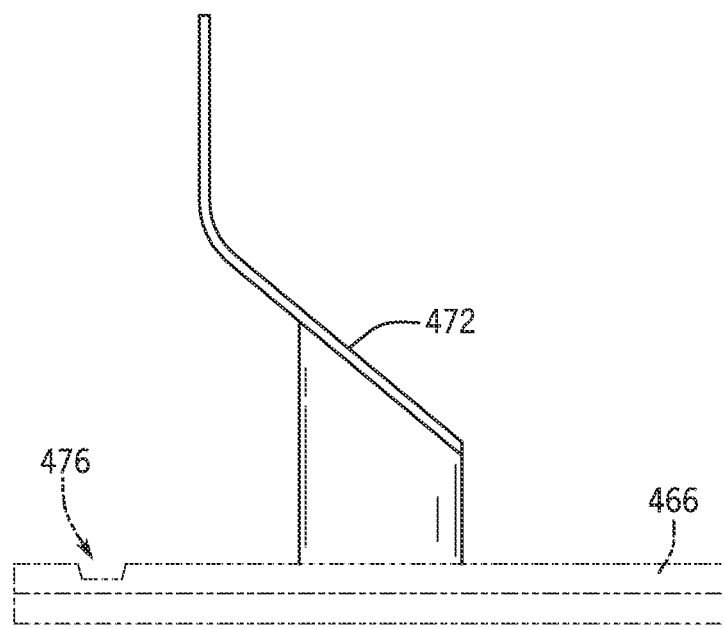
FIG. 9D illustrates a left elevation view of the anchor of FIG. 9B in accordance with an embodiment of the disclosure. The right elevation view of the anchor may be a mirror image of FIG. 9D.
Figure 9E:
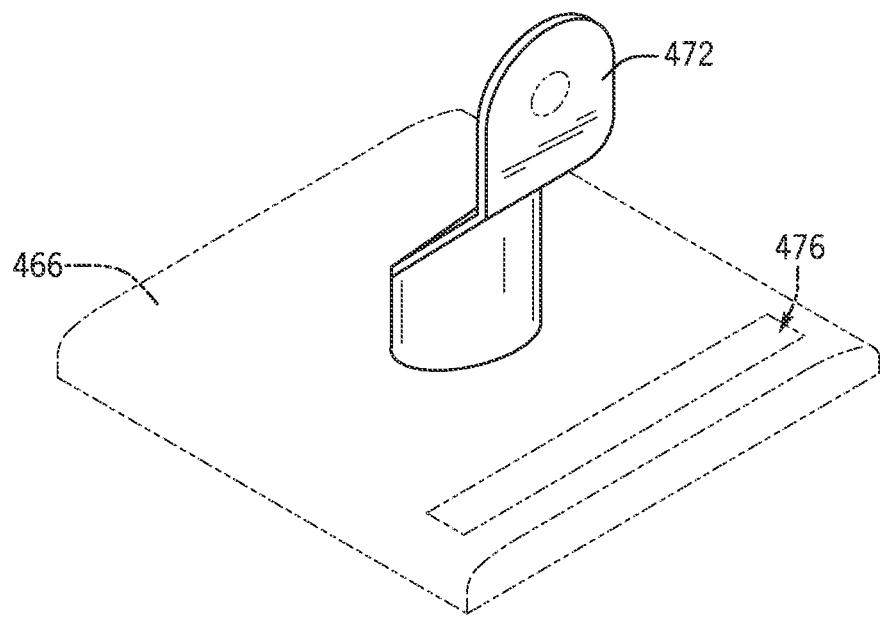
FIG. 9E illustrates a top, rear, right perspective view of the anchor of FIG. 9B in accordance with an embodiment of the disclosure.
Figure 9F:
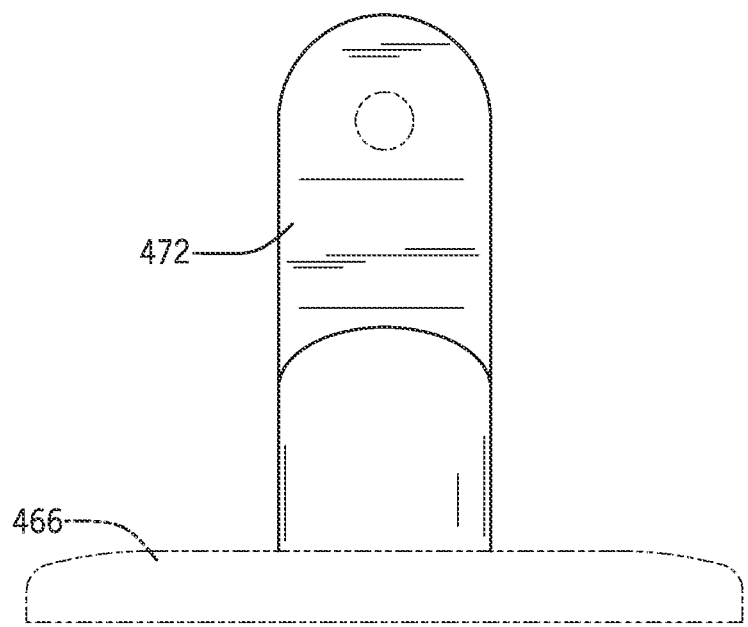
FIG. 9F illustrates a rear elevation view of the anchor of FIG. 9B in accordance with an embodiment of the disclosure.

FIGS. 9B-9F illustrate various diagrams of the anchor 472 with some features shown in dotted lines to highlight the anchor 472. Specifically, FIG. 9B illustrates a top, front perspective view of the anchor 472, FIG. 9C illustrates a front elevation view of the anchor 472, FIG. 9D illustrates a left elevation view of the anchor, FIG. 9E illustrates a top, rear perspective view of the anchor 472, and FIG. 9F illustrates a rear elevation view of the anchor 472 in accordance with an embodiment of the disclosure. The right elevation view of the anchor 472 may be a mirror image of FIG. 9D. FIG. 9G illustrates another diagram of the docking station 464 in accordance with an embodiment of the disclosure.

Figure 10:
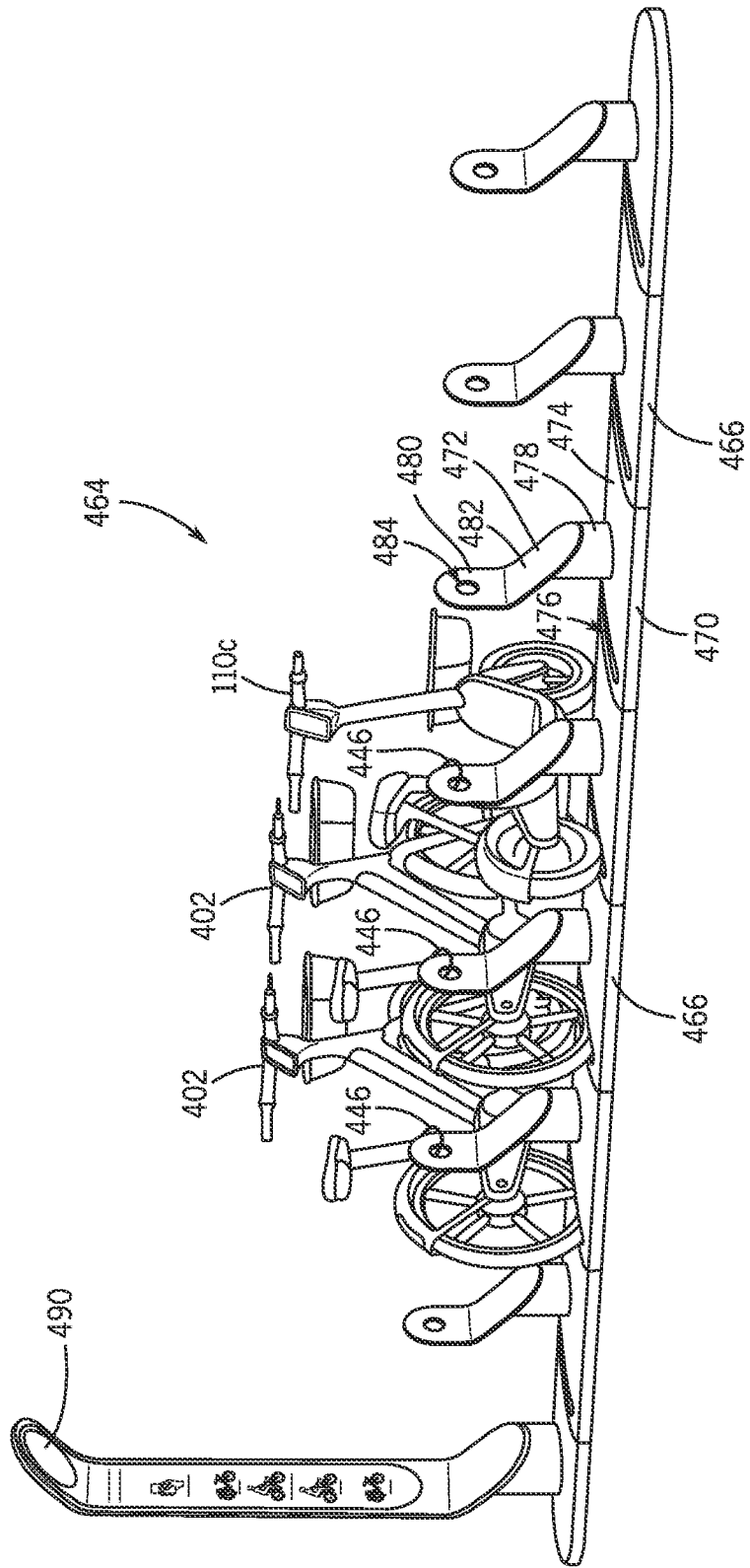
FIG. 10 illustrates a diagram of an alternative geometry for the docking station of FIG. 8 in accordance with an embodiment of the disclosure.

FIG. 10 illustrates a diagram of an alternative geometry for the docking station 464 in accordance with an embodiment of the disclosure. Specifically, the beacon 468 may include one or more features facilitating use of the docking station 464. For instance, the beacon 468 may include a light 490 illuminating the docking station 464 during low light conditions. The light 490 may provide general ambient light or may provide focused lighting on one or more racks 466 of the docking station 464. In some embodiments, the light 490 may illuminate based on one or more detected conditions. For example, the light 490 may illuminate when a micromobility transit vehicle is being removed from the docking station 464 or when a micromobility transit vehicle is being locked to the docking station 464. In some embodiments, the light 490 may illuminate when a threat to the docking station 464 and/or to one or more of the micromobility transit vehicles docked within the docking station 464 is detected. In some embodiments, the light 490 may illuminate based on a detected movement adjacent to the docking station 464.

Figure 11:
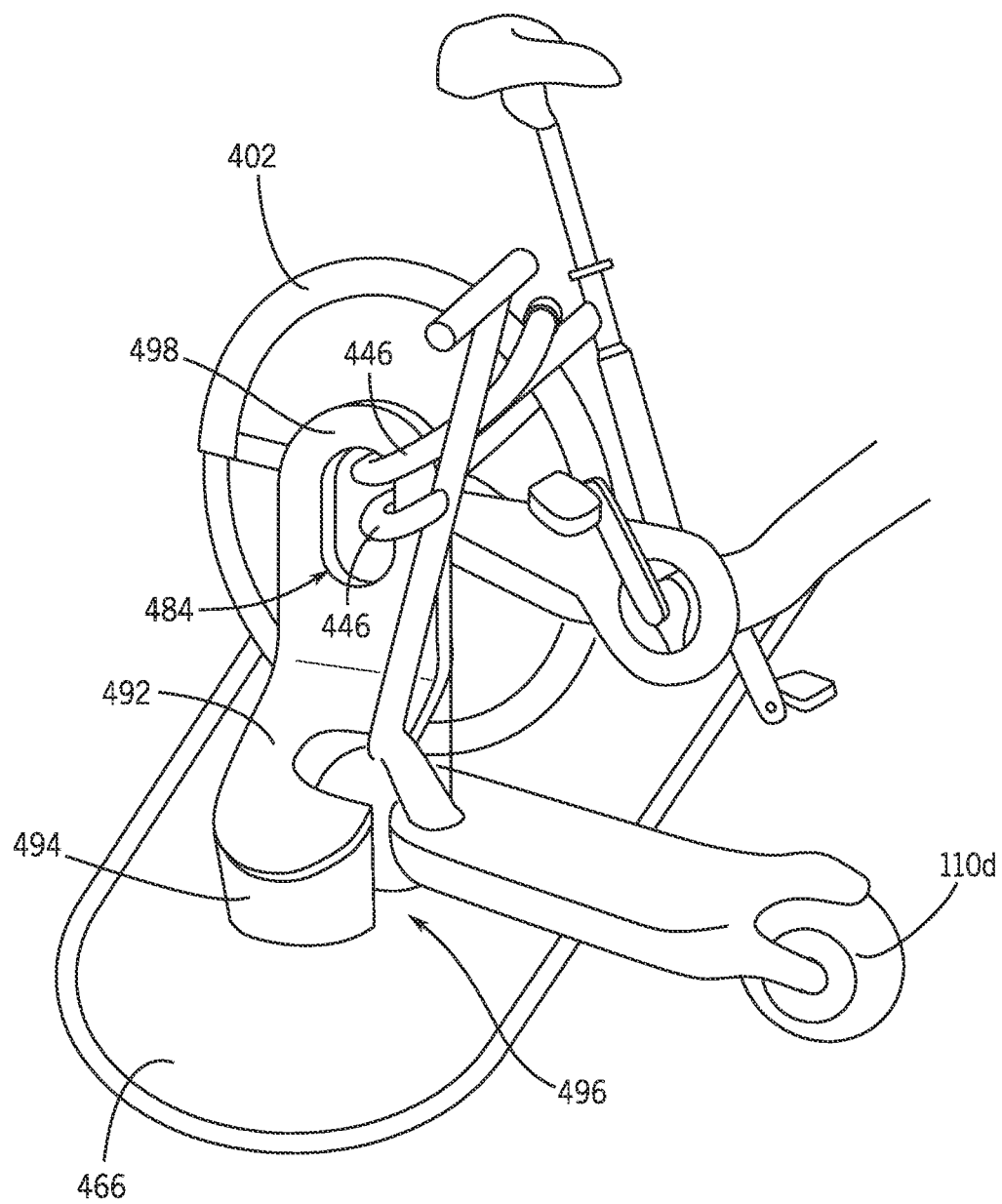
FIG. 11 illustrates a diagram of a docking station anchor in accordance with an embodiment of the disclosure.

FIG. 11 illustrates a diagram of an anchor 492 in accordance with an embodiment of the disclosure. Unless otherwise noted, the anchor 492 may be similar to anchor 472 described above, or vice versa. In some embodiments, the anchor 492 may be configured to provide a dual-purpose function. For example, the anchor 492 may be configured to receive or secure multiple micromobility transit vehicles. As shown, the anchor 492 may include a post 494 with a recess 496 configured to receive a first micromobility transit vehicle (e.g., micromobility transit vehicle 110d), such as via a lock structure within the recess 496. Similar to anchor 472, the anchor 492 may also include a rack plate 498 configured to secure a second micromobility transit vehicle (e.g., micromobility transit vehicle 402), such as in a manner as described above (e.g., via lock hole 484 in alignment with the locking device 444 of the second micromobility transit vehicle, etc.). In some embodiments, a locking cable 446 from each the first micromobility transit vehicle and the second micromobility transit vehicle may be received within the lock hole 484 of rack plate 498 to secure the first and second micromobility transit vehicles.

Figure 12:
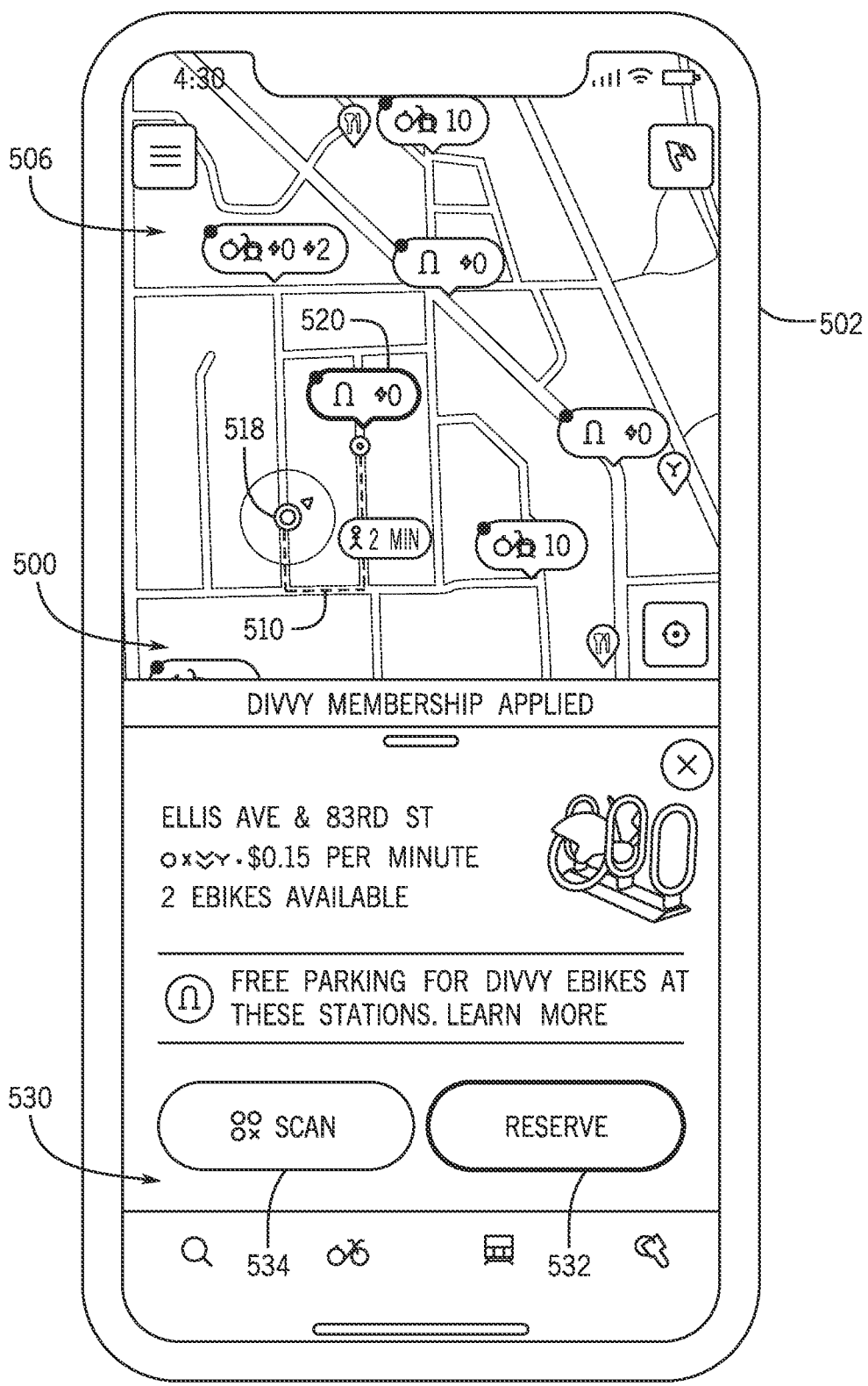
FIG. 12 illustrates a first diagram of a user interface in accordance with an embodiment of the disclosure.

FIG. 12 illustrates a first diagram of a user interface 500 in accordance with an embodiment of the disclosure. Referring to FIG. 12, user interface 500 may be a graphical user interface of an application running on a mobile computing device 502. The user interface 500 may display information related to use of the micromobility transit vehicle 402. For example, user interface 500 may show a travel route for a transportation requester or rider from a first location (e.g., a starting location) to a second location (e.g., a destination), as depicted in a map window 506 rendered by the user interface 500. In some embodiments, user interface 500 may show a travel route from the first location to the second location using different transportation modalities (e.g., a planned multimodal route), similar to user interface 132 described above. The planned multimodal route may include, for example, a walking route 510, a micromobility route 512 (e.g., using one or more of micromobility transit vehicles 110, 110c, 110d, or 402), a public transportation route (e.g., using buses, light rails, or other mass transit options), or any combination thereof.

For example, as shown in FIG. 12, user interface 500 may display a walking route 510 from a starting location 518 to a first docking station 520. The starting location 518 may be defined by a first user input received through the user interface 500. The first user input may be any user input defining a starting address, location, point-of-interest, or area. In some embodiments, the starting location 518 may be defined by the current location of the mobile computing device 502, for example, through GPS. The first docking station 520 may be the station closest to the starting location 518, the closest station with available vehicles for use, or a desired station selected through the user interface 500. In some embodiments, the user interface 500 may display a plurality of docking stations within a predetermined distance from the starting location 518. The predetermined distance may be set by user input or defined by the map extents of map window 506. In such embodiments, a second user input may be received through the user interface 500, the second user input selecting the first docking station 520 from the plurality of docking stations displayed in the user interface 500. Once both the starting location 518 and the first docking station 520 (or starting station) are set or selected through the user interface 500, the walking route 510 may be calculated from the starting location 518 to the first docking station 520.

In various embodiments, the statuses of one or more docking stations near the starting location 518 may be displayed in the user interface 500. The user interface 500 may display the number of transit vehicles available for use, if any, at each displayed docking station, the type of docking station (e.g., docking station 300 vs. docking station 400, docking station 300 vs. docking station 464, etc., as indicated by distinct symbols), whether the docking station is online or offline, or the like. For example, the first docking station 520 is shown in FIG. 12 to include two micromobility transit vehicles available for use, with other displayed docking stations showing ten, two, or zero micromobility transit vehicles available for use. In some embodiments, the docking stations displayed within the user interface 500 may be visually distinguished within the map window 506 of the user interface 500 based on docking station status. For example, online stations may be distinguished by a first color, pattern, and/or symbol, with offline stations distinguished by a second color, pattern, and/or symbol. In some embodiments, the statuses displayed may be dynamic and change in real-time. For instance, as micromobility transit vehicles are removed from or parked at each docking station, the displayed status may change.

With continued reference to FIG. 12, the user interface 500 may include an information window 530. Vehicle status data, vehicle information, docking station status and availability, user notices and alerts, and functionality prompts/commands may be rendered in the information window 530. The information window 530 may be dynamic and render different information or data based on user input received through the user interface 500. For example, when the first docking station 520 is selected, the location of the first docking station 520, the status of the first docking station 520, and the number of available transit vehicles for use, among others, may be rendered in the information window 530. In one embodiment, the information window 530 may include a reserve button 532 to reserve a micromobility transit vehicle at the first docking station 520 for use, a scan button 534 to scan a unique code of a micromobility transit vehicle for use, or the like.

Figure 13:
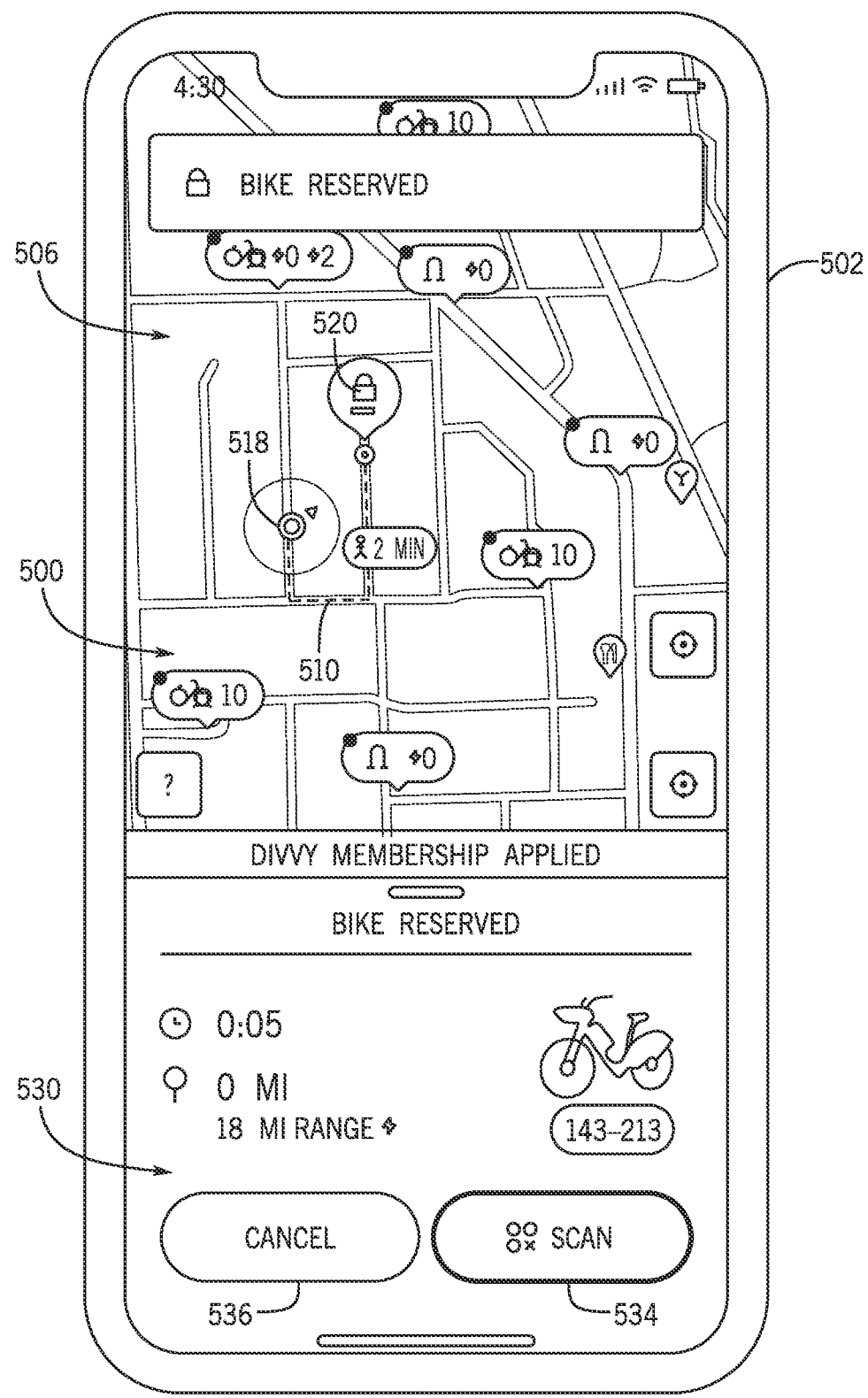
FIG. 13 illustrates a second diagram of the user interface of FIG. 12 in accordance with an embodiment of the disclosure.

FIG. 13 illustrates a second diagram of the user interface 500 in accordance with an embodiment of the disclosure.

Referring to FIGS. 12 and 13, use of a micromobility transit vehicle from the first docking station 520 may be provided, such as to a user of the mobile computing device 502. For instance, user selection of the reserve button 532 in user interface 500 may reserve use of a micromobility transit vehicle at the first docking station 520. As shown in FIG. 13, once the micromobility transit vehicle is reserved, the user interface 500 may navigate the transportation requester or rider to the first docking station 520. Also, the information window 530 may display information about the reserved micromobility transit vehicle (e.g., serial number, vehicle range, etc.), a running clock of the ride time, total miles ridden, or the like. The information window 530 may also give the option for the transportation requester or rider to cancel the reservation (e.g., via a cancel button 536) or scan the reserved micromobility transit vehicle at the first docking station 520 to unlock the reserved vehicle from the docking station, such as in a manner described above.

Figure 14:
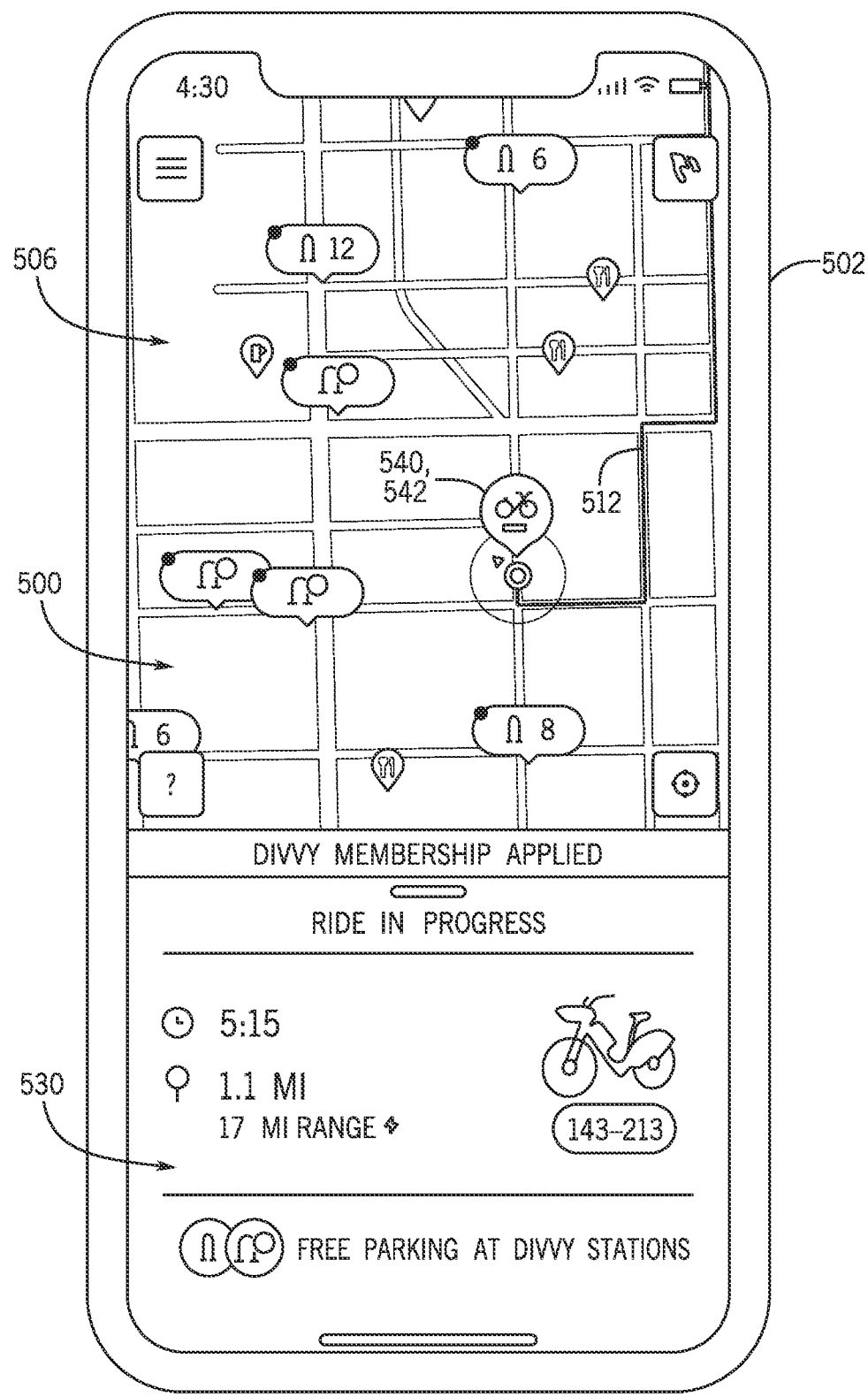
FIG. 14 illustrates a third diagram of the user interface of FIG. 12 in accordance with an embodiment of the disclosure.
Figure 15:
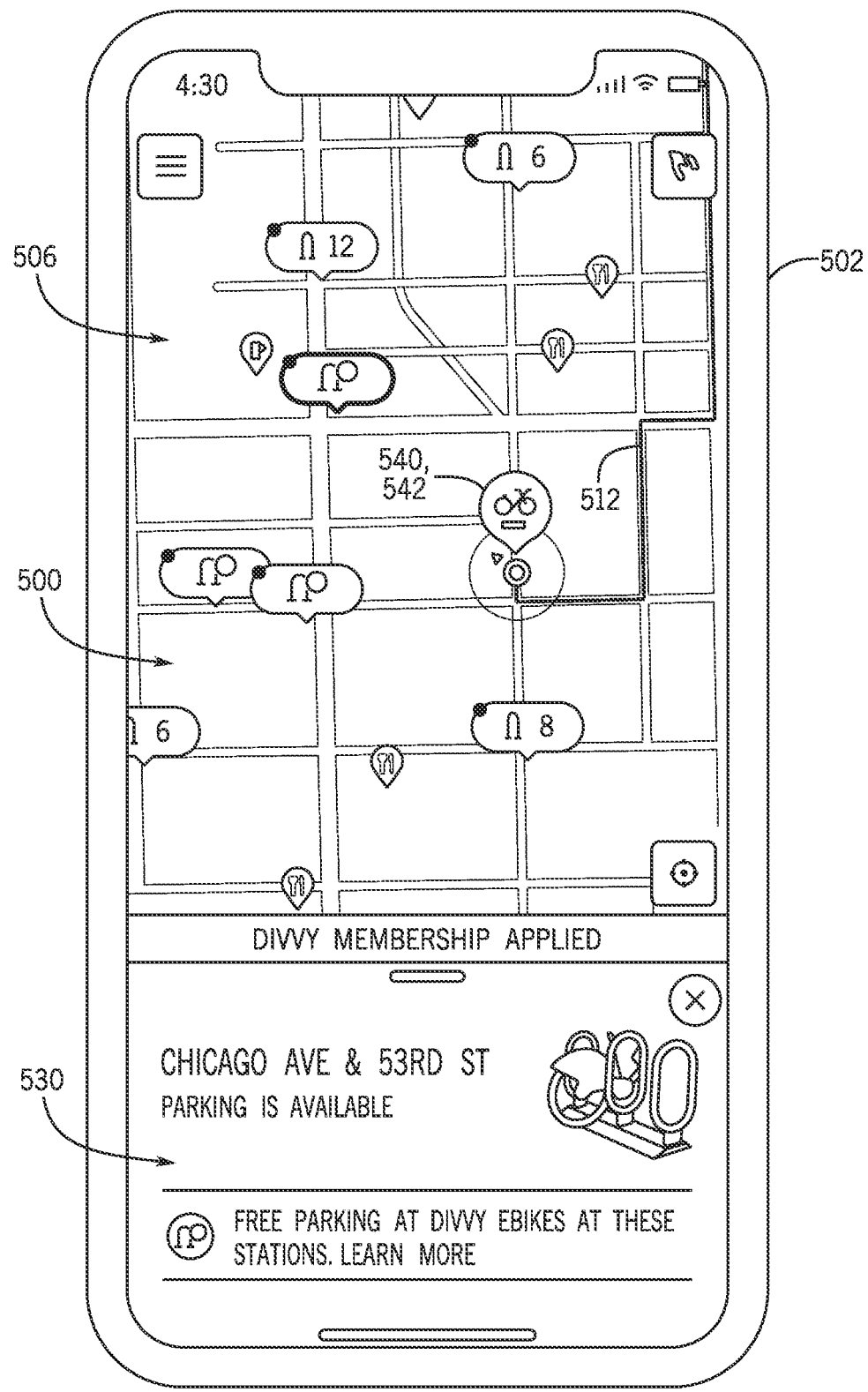
FIG. 15 illustrates a fourth diagram of the user interface of FIG. 12 in accordance with an embodiment of the disclosure.

FIG. 14 illustrates a third diagram of the user interface 500 in accordance with an embodiment of the disclosure. FIG. 15 illustrates a fourth diagram of the user interface 500 in accordance with an embodiment of the disclosure. Referring to FIGS. 14 and 15, the user interface 500 may navigate a transportation requester or rider to a destination 540 while in-ride. The destination 540 may be a second docking station 542, point-of-interest, area, address, or other location. The destination 540 may be defined by a third user input received through the user interface 500. The second docking station 542 may be the station closest to the destination 540, the closest station with available docks for parking the micromobility transit vehicle, or a desired station selected through the user interface 500. In some embodiments, the user interface 500 may display a plurality of docking stations within a predetermined distance from the destination 540 or the current position of the rider in-ride. The predetermined distance may be set by user input or defined by the map extents of map window 506. In such embodiments, a fourth user input received through the user interface 500 may select the second docking station 542 from the plurality of docking stations displayed in the user interface 500. Once the second docking station 542 (or destination station) is set or selected through the user interface 500, the micromobility route 512 may be calculated to the second docking station 542 to navigate the transportation requester or rider to the second docking station 542 through the user interface 500.

The statuses of one or more docking stations within a predetermined distance from the destination 540 or the current position of the rider in-ride may be displayed in the user interface 500. The predetermined distance may be set by user input or defined by the map extents of map window 506. The user interface 500 may display the number of parking spots or docks available, if any, at each displayed docking station, the type of docking station (e.g., docking station 300 vs. docking station 400, docking station 300 vs. docking station 464, etc., as indicated by distinct symbols), whether the docking station is online or offline, or the like. For example, as shown in FIG. 15, the second docking station 542 is shown to include available parking in the information window 530. In some embodiments, the user interface 500 may show the number of available parking spots (or docks) at a docking station. In some embodiments, the docking stations displayed within the user interface 500 may be visually distinguished within the user interface 500 based on docking station status. For example, online stations may be distinguished by a first color, pattern, and/or symbol in the map window 506, with offline stations distinguished by a second color, pattern, and/or symbol. In some embodiments, the statuses displayed may be dynamic and change in real-time. For instance, as micromobility transit vehicles are removed from or parked at each docking station, the displayed status may change.

Figure 16:
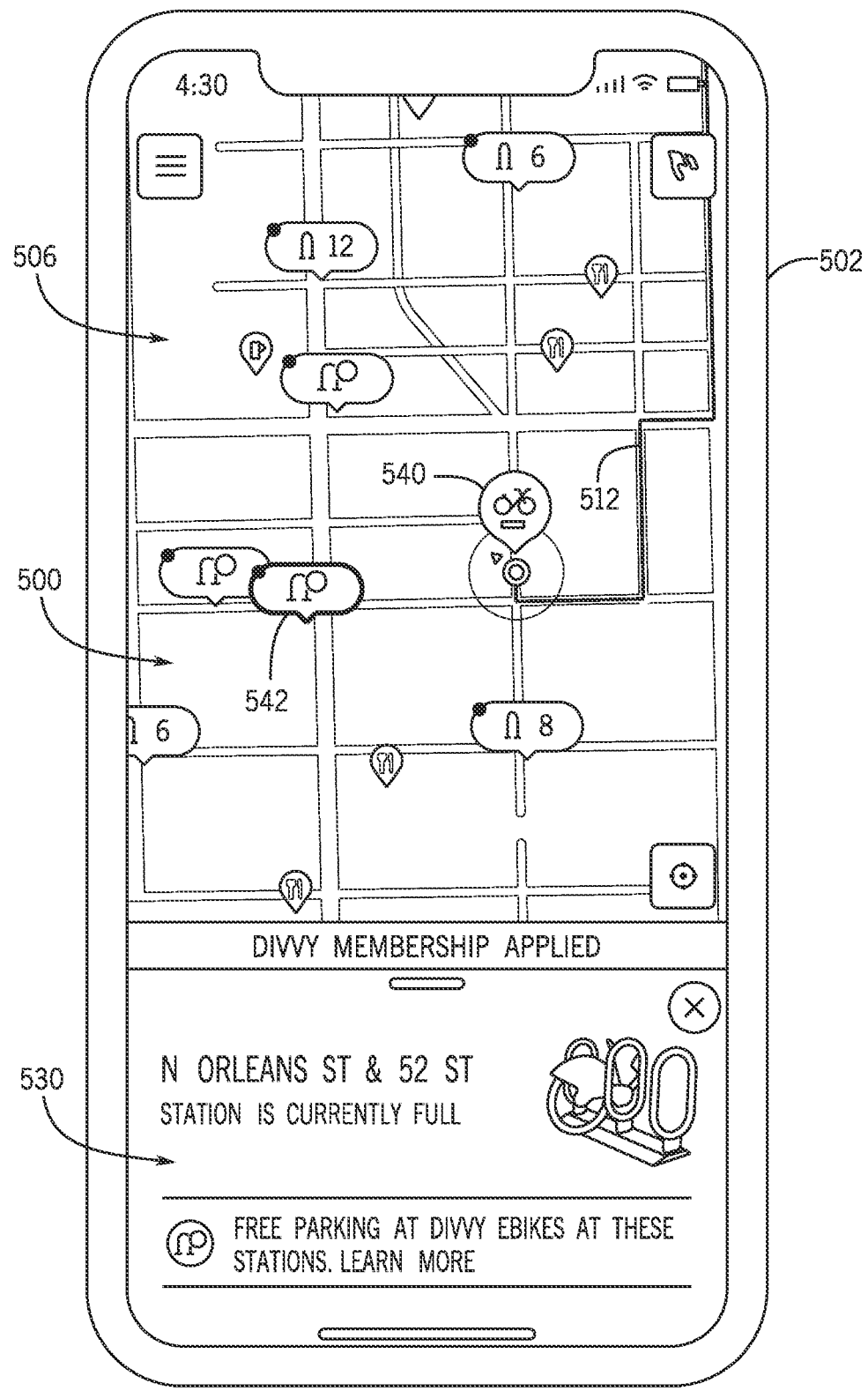
FIG. 16 illustrates a fifth diagram of the user interface of FIG. 12 in accordance with an embodiment of the disclosure.

FIG. 16 illustrates a fifth diagram of the user interface 500 in accordance with an embodiment of the disclosure. Referring to FIG. 16, the user interface 500 may provide a notification or warning when the second docking station 542 (or destination station) is full, unavailable, or offline. For instance, the user interface 500 may visually distinguish the full, unavailable, or offline docking station in the map window 506. A notification or warning may also be provided in the information window 530 of the user interface 500. The notification may be a push notification, an in-app notification, an email, a voice call, or the like. In some embodiments, an alternative docking station may be suggested (e.g., within the information window 530) if the second docking station 542 is full, unavailable, or offline.

Figure 17:
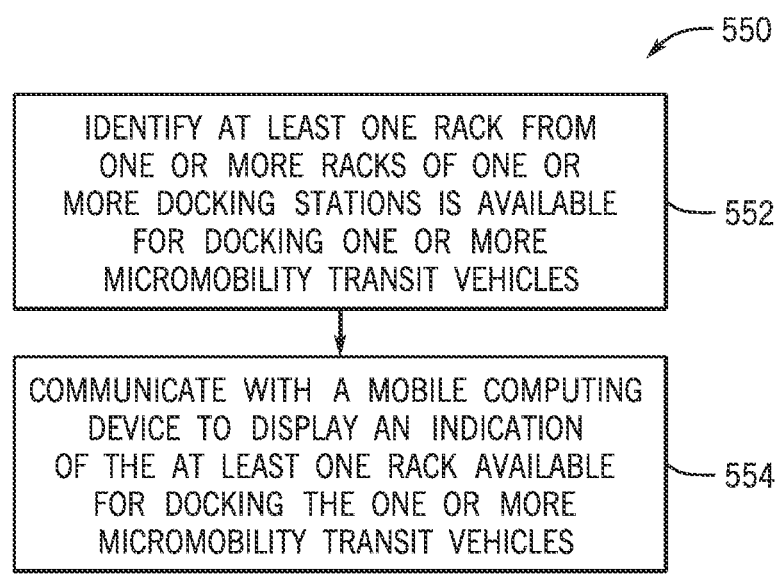
FIG. 17 illustrates a flow diagram of a process of determining a docking availability at one or more docking stations in accordance with an embodiment of the disclosure.

FIG. 17 illustrates a flow diagram of a process 550 of determining a docking availability at one or more docking stations in accordance with an embodiment of the disclosure. It should be appreciated that any step, sub-step, sub-process, or block of process 550 may be performed in an order or arrangement different from the embodiments illustrated by FIG. 17. For example, one or more blocks may be omitted from or added to the process 550. Although process 550 is described with reference to the embodiments of FIGS. 1-16, process 550 may be applied to other embodiments.

The one or more docking stations associated with process 550 may be similar to docking station 400 or docking station 464 described above. For example, each docking station may include one or more racks each similar to rack 404 or rack 466, with a lock hole in a rack plate and one or more alignment features configured to align the lock hole in the rack plate with a respective locking device of one or more micromobility transit vehicles (e.g., any one of micromobility transit vehicles 110b, 110c, 110d, or 402).

In Block 552, process 550 includes identifying at least one rack from one or more racks of one or more docking stations is available for docking one or more micromobility transit vehicles. Block 552 may include detecting an occupancy condition of the at least one rack. Detecting the occupancy condition of the at least one rack may include detecting a pairing status between a passive sensor of the at least one rack and one or more micromobility transit vehicles docked to the at least one rack.

In some embodiments, detecting the occupancy condition of the at least one rack may include communicating with one or more micromobility transit vehicles docked to the one or more docking stations to cause the one or more docked micromobility transit vehicles to transmit a wireless signal and communicating with the one or more docked micromobility transit vehicles to determine one or more responses to the wireless signal. The at least one available rack from the one or more racks may be identified based at least on the one or more responses. For example, if the number of received responses is less than the number of racks of the one or more docking stations, the difference may determine the number of available racks. In some embodiments, the one or more responses may identify which rack of the one or more racks is available for docking one or more micromobility transit vehicles.

In Block 554, process 550 includes communicating with a mobile computing device to display an indication of the at least one rack available for docking the one or more micromobility transit vehicles. For instance, at combination of rack availability, rack capacity, rack status, or the like may be rendered on the mobile computing device 502, as explained above. Communicating with the mobile computing device may cause the mobile computing device to further display instructions to lock the one or more micromobility transit vehicles to a rack of the one or more racks. For example, one or more visual cues, written instructions, or reminders related to locking a micromobility transit vehicle to rack 404 or rack 466 may be rendered on the mobile computing device 502.

Figure 18:
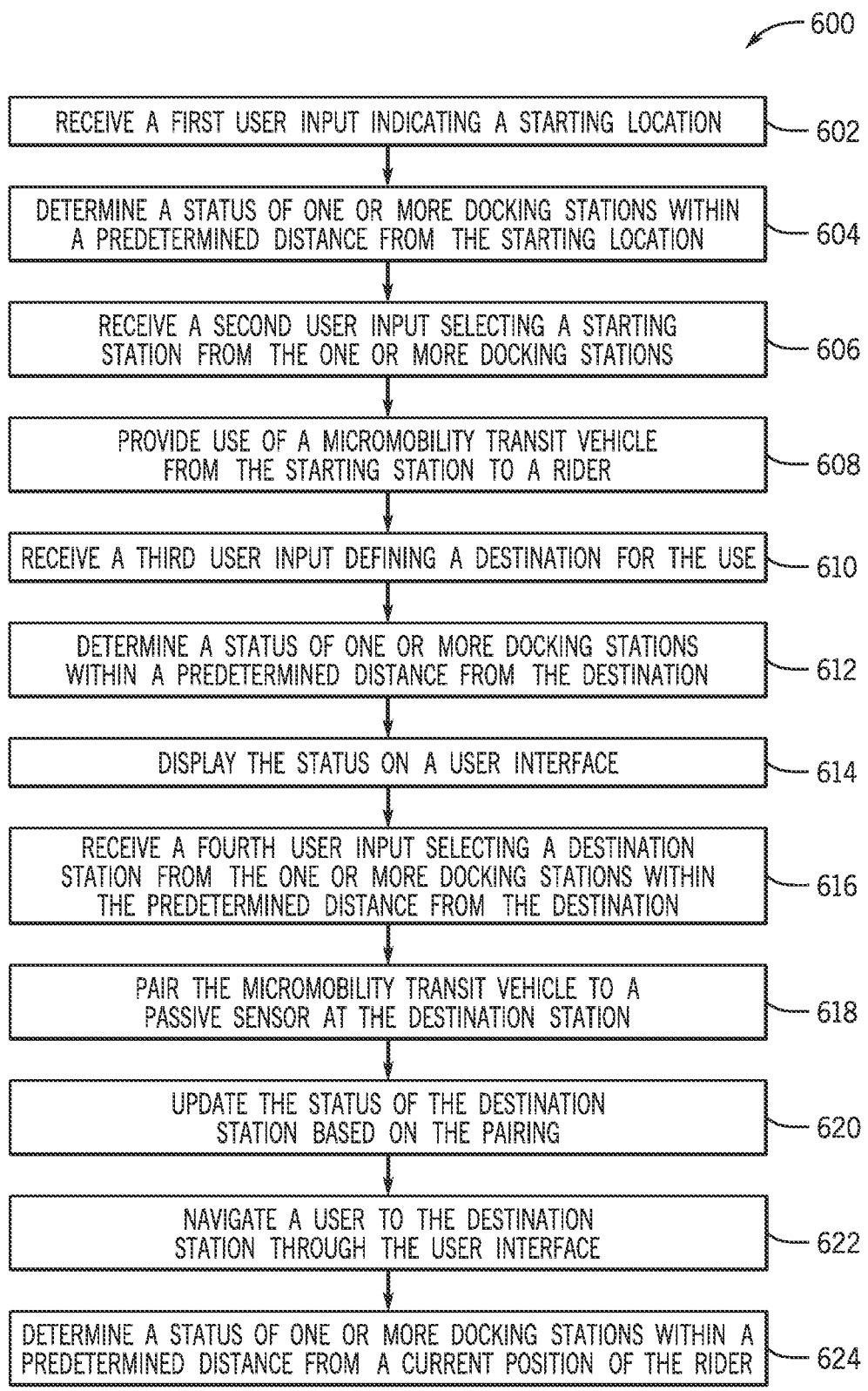
FIG. 18 illustrates a flow diagram of a process of providing a use of a micromobility transit vehicle in accordance with an embodiment of the disclosure.

FIG. 18 illustrates a flow diagram of a process 600 of providing a use of a micromobility transit vehicle in accordance with an embodiment of the disclosure. It should be appreciated that any step, sub-step, sub-process, or block of process 600 may be performed in an order or arrangement different from the embodiments illustrated by FIG. 18. For example, one or more blocks may be omitted from or added to the process 600. Although process 600 is described with reference to the embodiments of FIGS. 1-16, process 600 may be applied to other embodiments.

In Block 602, process 600 includes receiving, through a user interface of an application running on a mobile computing device, a first user input indicating a starting location. For example, user input may be received through user interface defining a starting address, location, point-of-interest, or area, as explained above. The user interface may be similar to user interface 500 described above.

In Block 604, process 600 includes determining a status of one or more docking stations within a predetermined distance from the starting location. The predetermined distance may be set by user input or defined by the map extents of map window 506. Management system 240 or other component of system 100 or system 200 may determine whether the one or more docking stations within the predetermined distance from the starting location are online or offline, how many and/or what type of micromobility transit vehicles are available for use in the one or more docking stations, the charge status of each micromobility transit vehicle parked at the one or more docking stations, or docking station type, among others, based on data received from the one or more docking stations within the predetermined distance from the starting location.

In Block 606, process 600 includes receiving, through the user interface displaying the status, a second user input selecting a starting station from the one or more docking stations. For instance, user input may be received through user interface selecting a docking station from the displayed one or more docking stations.

In Block 608, process 600 includes providing a use of a micromobility transit vehicle from the starting station to a transportation requester or rider. For example, micromobility transit vehicle may be reserved or unlocked from docking station, such as via user interface, as described above.

In Block 610, process 600 may include receiving, through the user interface, a third user input defining a destination for the use. For example, user input may be received through user interface defining a point-of-interest, area, address, or other desired destination location.

In Block 612, process 600 may include determining a status of one or more docking stations within a predetermined distance from the destination. The predetermined distance may be set by user input or defined by the map extents of map window 506. Management system 240 or other component of system 100 or system 200 may determine whether the one or more docking stations within the predetermined distance from the destination are online or offline, how many parking spots or racks are available at the one or more docking stations, how many parking spots or racks are available for different types of micromobility transit vehicles, or docking station type, among others, based on data received from the one or more docking stations within the predetermined distance from the destination.

In Block 614, process 600 may include displaying the status on the user interface. For instance, the user interface may visually display the status through color, pattern, and/or symbol differentiation within one or more windows rendered on the user interface. In this manner, the one or more docking stations may be visually distinguished within the user interface based on status. In some embodiments, the displayed status may change (e.g., dynamically or automatically) as a change in status is detected or determined for the one or more docking stations.

In Block 616, process 600 may include receiving, through the user interface, a fourth user input selecting a destination station from the one or more docking stations within the predetermined distance from the destination. The destination station may be similar to docking station. Specifically, the destination station may include a rack having a geometry configured to interface with a locking device integrated with the micromobility transit vehicle. For instance, the rack may include a hole sized and shaped to align with the locking device to permit locking of the micromobility transit vehicle to the rack. In some embodiments, the destination station may include a passive sensor configured to passively pair with the micromobility transit vehicle. The pairing may allow one or more characteristics of the destination station to be determined or detected, as explained above. In such embodiments, process 600 may include pairing the micromobility transit vehicle to the passive sensor at the destination station (Block 618) and upon or after the pairing, updating the status of the destination station based on the pairing (Block 620).

In Block 622, process 600 may include navigating the transportation requester or rider to the destination station through the user interface. In Block 624, process 600 may include determining a status of one or more docking stations within a predetermined distance from a current position of the rider while in ride. The predetermined distance may be set by user input or defined by the map extents of map window 506. Management system 240 or other component of system 100 or system 200 may determine whether the one or more docking stations within the predetermined distance from the rider's current position are online or offline, how many parking spots or racks are available at the one or more docking stations, how many parking spots or racks are available for different types of micromobility transit vehicles, or docking station type, among others. In this manner, the rider may be able to check parking availability while in-ride.

Figure 19:
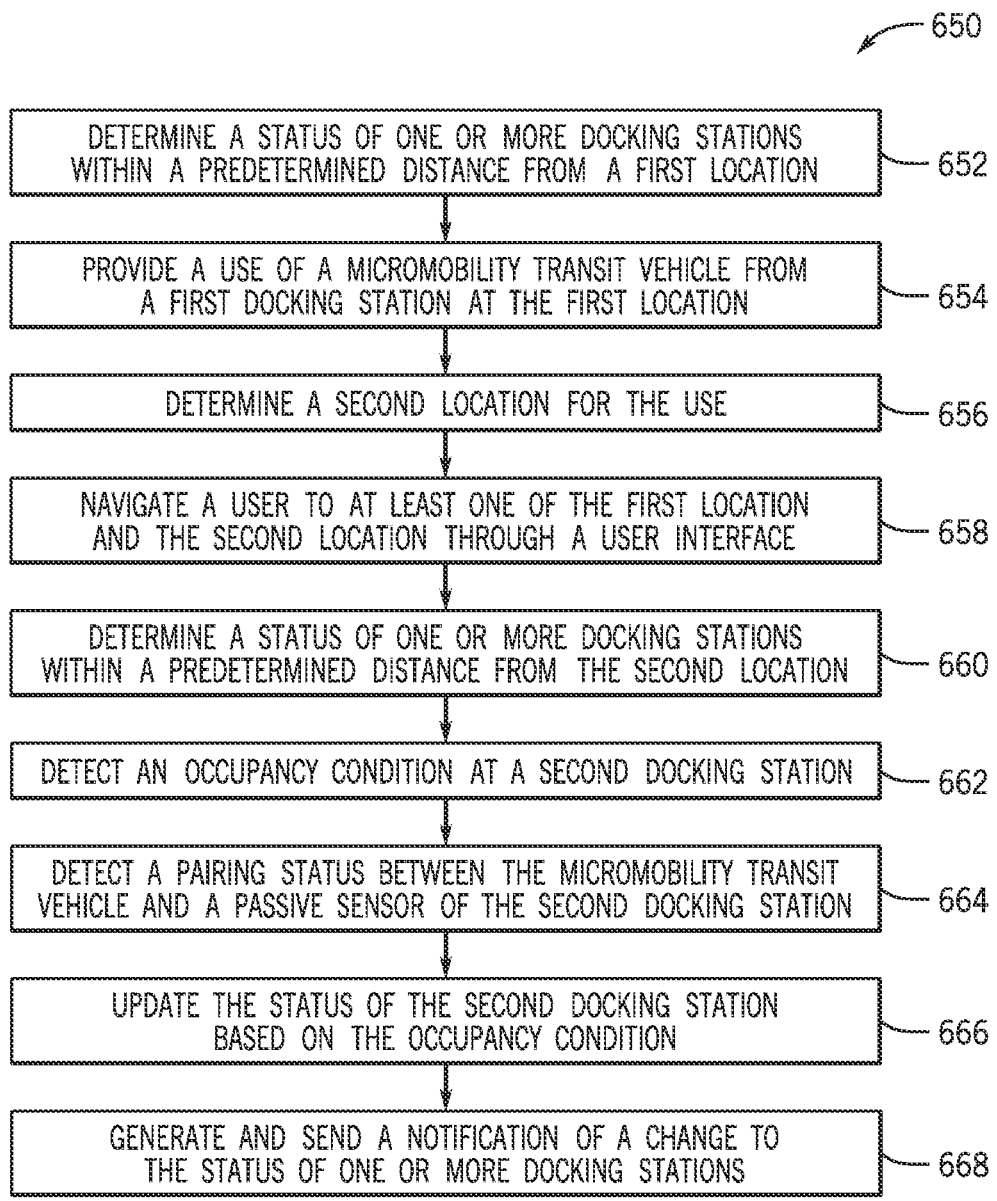
FIG. 19 illustrates a flow diagram of a process of managing a system of docking stations and micromobility transit vehicles in accordance with an embodiment of the disclosure.

FIG. 19 illustrates a flow diagram of a process 650 of managing a system of docking stations and micromobility transit vehicles in accordance with an embodiment of the disclosure. It should be appreciated that any step, sub-step, sub-process, or block of process 650 may be performed in an order or arrangement different from the embodiments illustrated by FIG. 19. For example, one or more blocks may be omitted from or added to the process 650. Although process 650 is described with reference to the embodiments of FIGS. 1-16, process 650 may be applied to other embodiments.

In Block 652, process 650 may include determining a status of one or more docking stations within a predetermined distance from a first location. The predetermined distance may be set by user input or defined by the map extents of map window 506. Management system 240 or other component of system 100 or system 200 may determine whether the one or more docking stations within the predetermined distance from the first location are online or offline, how many and/or what type of micromobility transit vehicles are available for use in the one or more docking stations, the charge status of each micromobility transit vehicle parked at the one or more docking stations, or docking station type, among others. The first location may be a starting location defined by a first user input received through a user interface of an application running on a mobile computing device. In some embodiments, the first location may be a current location of the mobile computing device, as defined, for example, through GPS. The user interface may be similar to user interface 500 described above.

In Block 654, process 650 includes providing a use of a micromobility transit vehicle from a first docking station at the first location. For example, the micromobility transit vehicle may be rented from the first docking station to the transportation requester or rider. The first docking station may be an online station of the one or more docking stations within the predetermined distance from the first location.

In Block 656, process 650 includes determining a second location for the use. In some embodiments, the second location may be determined based on the use of the micromobility transit vehicle. For example, the second location may be determined based on a reservation of the micromobility transit vehicle (e.g., second location provided at time of use), based on a rental agreement associated with the micromobility transit vehicle (e.g., must return to same location, must return to location designated in agreement, etc.), based on transportation or rider history, etc. The second location may be a destination defined by a second user input received through the user interface.

In Block 658, process 650 may include navigating a user to at least one of the first location and the second location through the user interface. For example, a transportation requester or rider may be navigated to at least one of the first location and the second location through the user interface.

In Block 660, process 650 includes determining a status of one or more docking stations within a predetermined distance from the second location. The predetermined distance may be set by user input or defined by the map extents of map window 506. Block 660 may include at least one of determining whether the one or more docking stations are online or offline, determining how many micromobility transit vehicles are available for rent at the one or more docking stations, or determining how many parking locations are available at the one or more docking stations.

In Block 662, process 650 includes detecting an occupancy condition at a second docking station of the one or more docking stations within the predetermined distance from the second location. The second docking station may be similar to docking station 400 or docking station 464. For instance, the second docking station may include a rack having a geometry configured to interface with a locking device integrated with the micromobility transit vehicle. For instance, the rack may include a lock hole sized and shaped to align with the locking device to permit locking of the micromobility transit vehicle to the rack. In one embodiment, the hole may be sized and shaped to align with a latch of the locking device to lock the micromobility transit vehicle to the rack.

In some embodiments, the second docking station may include a passive sensor configured to passively pair with the micromobility transit vehicle. The pairing may allow one or more characteristics of the destination station to be determined or detected, as explained above. In such embodiments, Block 664 may include detecting a pairing status between the micromobility transit vehicle and the passive sensor of the second docking station.

In Block 666, process 650 includes updating, upon or after the detecting, the status of the second docking station based on the occupancy condition. In one embodiment, as one or more micromobility transit vehicles are parked, locked, or otherwise docked to the second docking station, or as one or more micromobility transit vehicles are rented, unlocked, or otherwise removed from the second docking station, the status of the second docking station may be updated. For example, the number of available parking spots, number of available micromobility transit vehicles for use, or the like may be updated upon or after detecting of the occupancy condition. In Block 668, process 650 may include generating and sending a notification of a change to the status of the one or more docking stations within the predetermined distance from the second location for display on a mobile computing device (e.g., on the user interface). For instance, if a docking station changes status from online to offline, from available to unavailable, or the like, a notification may be generated and sent for display on the mobile computing device. The notification may be a push notification, an in-app notification, an email, a voice call, or the like.

Figure 20:
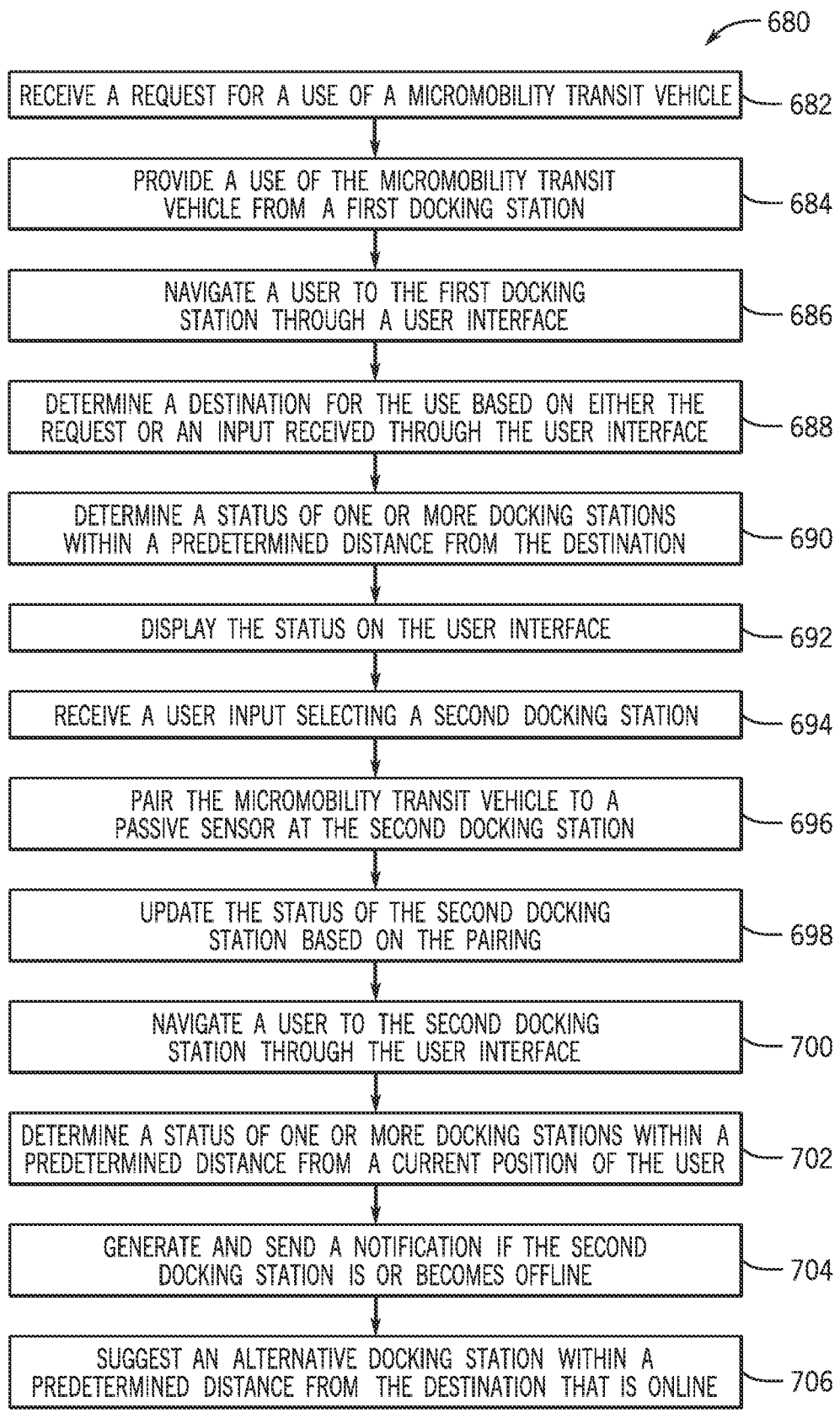
FIG. 20 illustrates a flow diagram of a process of managing a system of docking stations in accordance with an embodiment of the disclosure.

FIG. 20 illustrates a flow diagram of a process 680 of managing a system of docking stations in accordance with an embodiment of the disclosure. It should be appreciated that any step, sub-step, sub-process, or block of process 680 may be performed in an order or arrangement different from the embodiments illustrated by FIG. 20. For example, one or more blocks may be omitted from or added to the process 680. Although process 680 is described with reference to the embodiments of FIGS. 1-16, process 680 may be applied to other embodiments.

In Block 682, process 680 includes receiving a request, through a user interface of an application running on a mobile computing device of a user, for a use of a micromobility transit vehicle. For instance, a micromobility transit vehicle may be rented or otherwise requested by a transportation requester or rider through the user interface, such as via user input received through the user interface. The user interface may be similar to user interface 500 described above.

In Block 684, process 680 includes providing use of the micromobility transit vehicle to the user from a first docking station. For example, the micromobility transit vehicle may be rented to or reserved for the transportation requester or rider, such as in a manner as described above. In Block 686, process 680 may include navigating the transportation requester or rider to the first docking station through the user interface upon or after the providing. For instance, after the micromobility transit vehicle is rented to or reserved for the transportation requester or rider, the transportation requester or rider may be navigated to the first docking station through the user interface.

In Block 688, process 680 includes determining a destination for the use based on either the request or an input received through the user interface. For instance, the destination may be determined based on a reservation of the micromobility transit vehicle (e.g., destination provided by user with the request) or the transportation requester or rider may enter a destination within the user interface.

In Block 690, process 680 includes determining a status of one or more docking stations within a predetermined distance from the destination. Block 690 may include determining a number of parking locations available at the one or more docking stations, determining whether the one or more docking stations are online or offline, or the like.

In Block 692, process 680 includes displaying the status on the user interface. For example, the user interface may visually display the status through color, pattern, and/or symbol differentiation within one or more windows rendered on the user interface. In some embodiments, the displayed status may change (e.g., dynamically or automatically) as a change in status is detected or determined for the one or more docking stations.

In Block 694, process 680 includes receiving, through the user interface, a user input selecting a second docking station from the one or more docking stations within the predetermined distance from the destination. The second docking station may be similar to docking station 400 or docking station 464 described above. For example, the second docking station may include a rack having a geometry configured to interface with a locking device integrated with the micromobility transit vehicle, such as a hole sized and shaped to align with a latch of the locking device to permit locking of the micromobility transit vehicle to the rack. The second docking station may include a passive sensor configured to passively pair with the micromobility transit vehicle. In such embodiments, process 680 may include pairing the micromobility transit vehicle to the passive sensor at the second docking station (Block 696), and upon or after the pairing, updating the status of the second docking station based on the pairing (Block 698).

In Block 700, process 680 includes navigating the transportation requester or rider to the second docking station through the user interface. In Block 702, process 680 may include determining a status of one or more docking stations within a predetermined distance from a current position of the transportation requester or rider while in ride from the first docking station to the second docking station. The predetermined distance may be set by user input or defined by the map extents of map window 506. Management system 240 or other component of system 100 or system 200 may determine whether the one or more docking stations within the predetermined distance from the rider's current position are online or offline, how many parking spots or racks are available at the one or more docking stations, how many parking spots or racks are available for different types of micromobility transit vehicles, or docking station type, among others. In this manner, the rider may be able to check parking availability while in-ride.

In Block 704, process 680 may include generating and sending a notification when the second docking station is or becomes offline for display on the user interface. The notification may be a push notification, an in-app notification, an email, a voice call, or the like. In Block 706, process 680 may include suggesting an alternative docking station within a predetermined distance from the destination that is online. The predetermined distance may be set by user input or defined by the map extents of map window 506. The alternative docking station may be highlighted within the user interface or a notification (e.g., a push notification, an in-app notification, an email, or voice call) containing the suggested alternative docking station may be generated and sent.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A multimodal transportation system, comprising:
   a docking station for docking one or more micromobility transit vehicles, the docking station comprising a plurality of racks, each rack comprising:
      a base frame comprising frame segments,
      an anchor coupled to and extending vertically from at least one of the frame segments of the base frame, and
      a lock plate coupled to the anchor and including a lock hole, the lock hole being disposed through the lock plate and being capable of receiving a locking device associated with a micromobility transit vehicle so as to permit locking of the micromobility transit vehicle to the anchor;
   a sensor; and
   a processor in communication with the sensor, wherein the processor is configured to:
      identify, using the sensor, a docking availability of one or more racks of the plurality of racks; and
      transmit the docking availability of the one or more racks.

2. The multimodal transportation system of claim 1, further comprising:
   a beacon coupled to and extending vertically from at least one rack, the beacon comprising a panel coupled thereto, the panel having instructions related to use of the docking station; and
   wherein the plurality of racks is connected together via the base frame of each rack.

3. The multimodal transportation system of claim 1, wherein:
   the locking device is integrated with the micromobility transit vehicle; and
   the lock hole is configured to align with at least a portion of the locking device.

4. The multimodal transportation system of claim 1, further comprising a platform having a tire recess for receiving a tire of the micromobility transit vehicle.

5. The multimodal transportation system of claim 4, wherein receipt of the tire within the tire recess aligns the locking device with the lock hole.

6. The multimodal transportation system of claim 1, wherein the processor is configured to:

detect, using the sensor, at least one micromobility transit vehicle is removed from the one or more racks of the plurality of racks of the docking station; and update the docking availability of the one or more racks based on the detected removal of the at least one micromobility transit vehicle.

7. The multimodal transportation system of claim 1, wherein the anchor comprises a tubing structure having two ends coupled to the at least one of the frame segments of the base frame.

8. The multimodal transportation system of claim 7, wherein the tubing structure extends around the lock plate.

9. A docking station for docking a micromobility transit vehicle, the docking station comprising:
   a rack comprising:
      a base frame comprising frame segments,
      an anchor coupled to and extending vertically from at least one of the frame segments of the base frame; and
      a lock plate coupled to the anchor and including a lock hole, the lock hole being disposed through the lock plate and being capable of receiving a locking device associated with the micromobility transit vehicle so as to permit locking of the micromobility transit vehicle to the anchor;
   a sensor; and
   a processor in communication with the sensor, wherein the processor is configured to:
      detect the micromobility transit vehicle is docked to the lock plate using the sensor, and
      transmit a status of the micromobility transit vehicle based on the detecting the micromobility transit vehicle is docked to the lock plate.

10. The docking station of claim 9, wherein:
   the rack comprises a platform; and
   positioning of a tire of the micromobility transit vehicle on the platform vertically and laterally aligns the locking device with the lock hole.

11. The docking station of claim 10, wherein:
   the locking device is integrated with the micromobility transit vehicle; and
   the lock hole is configured to align with a fixed portion of the locking device.

12. The docking station of claim 10, wherein:
   the locking device comprises a pin latch;
   a vertical position of the lock hole within the lock plate is set to align with the pin latch when the tire of the micromobility transit vehicle is positioned on the platform to vertically align the pin latch with the lock hole; and
   a lateral position of the lock hole within the lock plate is set to align with the pin latch when the tire of the micromobility transit vehicle is positioned on the platform to laterally align the pin latch with the lock hole.

13. The docking station of claim 12, wherein the platform overlays at least a portion of the base frame, and wherein the platform comprises a tire recess for receiving a tire of the micromobility transit vehicle to vertically and laterally align the locking device with the lock hole.

14. The docking station of claim 9, further comprising:
   a beacon coupled to and extending vertically from at least one of the frame segments of the base frame, the beacon having a shape similar to the anchor; and
   a panel coupled to the beacon, the panel having instructions related to use of the docking station.

15. The docking station of claim 9, wherein the processor is configured to:
   identify, using the sensor, the rack of the docking station is available for docking; and
   transmit a status of the rack.

16. A station system comprising:
   a rack comprising:
      a base frame,
      an anchor coupled to and extending vertically from the base frame, and
      a lock plate coupled to the anchor and including a lock hole, the lock hole being disposed through the lock plate and being capable of receiving a locking device associated with a micromobility transit vehicle so as to permit locking of the micromobility transit vehicle to the anchor;
   a sensor; and
   a processor in communication with the sensor, wherein the processor is configured to:
      identify, using the sensor, a docking availability of the rack, and
      transmit the docking availability.

17. The station system of claim 16, further comprising a second rack connected to the rack end-to-end, the rack and second rack having a modular design to tailor the station system.

18. The station system of claim 17, wherein the processor is configured to:
   detect, using the sensor, the micromobility transit vehicle is docked to the rack; and
   transmit a status of the micromobility transit vehicle based on the detecting the micromobility transit vehicle is docked to the rack.

19. The station system of claim 16, wherein:
   the base frame comprises frame segments; and
   the lock plate is coupled to and extends orthogonally from at least one of the frame segments of the base frame.

20. The station system of claim 16, wherein:
   the locking device is a cable locking device integrated with the micromobility transit vehicle; and
   the lock hole is configured to align with the cable locking device.

* * * * *